US012058715B2

(12) United States Patent
Abotabl et al.

(10) Patent No.: US 12,058,715 B2
(45) Date of Patent: Aug. 6, 2024

(54) SIGNAL ESTIMATION FOR INTERFERENCE CANCELLATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US); Krishna Kiran Mukkavilli, San Diego, CA (US); Joseph Patrick Burke, San Diego, CA (US); Tingfang Ji, San Diego, CA (US); Renqiu Wang, San Diego, CA (US); Hwan Joon Kwon, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 144 days.

(21) Appl. No.: 17/530,354

(22) Filed: Nov. 18, 2021

(65) Prior Publication Data
US 2023/0156762 A1 May 18, 2023

(51) Int. Cl.
H04W 72/08 (2009.01)
H04L 5/14 (2006.01)
H04W 72/541 (2023.01)

(52) U.S. Cl.
CPC ............. *H04W 72/541* (2023.01); *H04L 5/14* (2013.01)

(58) Field of Classification Search
CPC ................................ H04W 72/541; H04L 5/14
See application file for complete search history.

(56) References Cited

U.S. PATENT DOCUMENTS 10,236,933 B2 * 3/2019 Chen ................. H04L 25/03006
10,785,753 B1 * 9/2020 Li .......................... H04L 5/0044
(Continued)

FOREIGN PATENT DOCUMENTS

CN      107968703 B      12/2019
WO      WO-2018089102 A1   5/2018
WO      WO-2019112618 A1   6/2019

OTHER PUBLICATIONS

Bai J., et al., "Distributed Full-Duplex via Wireless Side-Channels: Bounds and Protocols", IEEE Transactions on Wireless Communications, IEEE Service Center, Piscataway, NJ, US, vol. 12, No. 8, Aug. 1, 2013, pp. 4162-4173, XP011524764, ISSN: 1536-1276, DOI: 10.1109/TWC.2013.071913.122015, Sections I, II, III-A, III-B, III-C and III-D, p. 4162-4167, Figures 1, 2.
(Continued)

Primary Examiner — Bailor C Hsu
(74) Attorney, Agent, or Firm — Holland & Hart LLP

(57) ABSTRACT

Methods, systems, and devices for wireless communication are described to estimate interference for concurrent uplink and downlink communications based on an indication of one or more one or more characteristics of an interfering uplink signal communicated between a base station and a second user equipment (UE). The base station or the second UE may transmit, to a first UE, an indication of one or more characteristics of an uplink signal, such as a baseband of the uplink signal or one or more parameters of the uplink signal. The first UE may use the characteristic(s) of the uplink signal to estimate the baseband of the uplink signal and cancel interference associated with the uplink signal. For example, the first UE may use the baseband signal to estimate the interference and may subtract the estimated interference from a downlink signal received at the first UE.

24 Claims, 15 Drawing Sheets

(56) References Cited

U.S. PATENT DOCUMENTS

| | | | | |
|---|---|---|---|---|
| 11,140,695 | B1* | 10/2021 | Eyuboglu | H04W 72/535 |
| 11,474,197 | B2* | 10/2022 | Bayesteh | H04L 5/14 |
| 11,683,146 | B2* | 6/2023 | Mun | H04L 5/14 370/329 |
| 11,722,971 | B2* | 8/2023 | Dutta | H04W 52/383 370/330 |
| 2009/0088080 | A1* | 4/2009 | Zhang | H04W 72/52 455/63.1 |
| 2010/0135235 | A1* | 6/2010 | Ji | H04W 72/541 370/329 |
| 2015/0018001 | A1 | 1/2015 | Kim et al. | |
| 2016/0252350 | A1* | 9/2016 | Wharton | G01S 19/39 701/25 |
| 2017/0366377 | A1 | 12/2017 | Papasakellariou | |
| 2018/0152949 | A1 | 5/2018 | Guo et al. | |
| 2018/0287739 | A1* | 10/2018 | Kim | H04J 11/0023 |

OTHER PUBLICATIONS

International Search Report and Written Opinion—PCT/US2022/050306—ISA/EPO—Mar. 3, 2023.

* cited by examiner

SIGNAL ESTIMATION FOR INTERFERENCE CANCELLATION

FIELD OF TECHNOLOGY

The following relates to wireless communication, including signal estimation for interference cancellation.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some cases, a downlink transmission to a first UE may experience interference based on communications performed at a second UE, which interference may reduce a signal quality for downlink transmissions at the first UE.

SUMMARY

The described techniques relate to improved methods, systems, devices, and apparatuses that support signal estimation for interference cancellation. Generally, the described techniques provide for estimating interference for concurrent uplink and downlink communications based on an indication of one or more one or more characteristics of an interfering uplink signal communicated between a second user equipment (UE) and a base station. For example, the base station, the second UE, or both, may transmit, to a first UE, an indication of a resource allocation of the uplink signal, a transmit beam of the uplink signal, a modulation coding scheme (MCS) of the uplink signal, a transmit power of the uplink signal, or any combination thereof. Additionally or alternatively, the second UE or the base station may transmit an indication of a baseband of the uplink signal to the first UE. The first UE may use the characteristic(s) of the uplink signal included in the indication (e.g., information regarding the uplink signal, baseband of the uplink signal, or any combination thereof) to estimate the baseband of the uplink signal. The first UE may use the baseband of the uplink signal to cancel interference associated with the uplink signal. For example, the first UE may use the baseband signal to estimate the interference and may subtract the estimated interference from a downlink signal received at the first UE.

A method is described. The method may include receiving, from a second network node, at least one of: signaling that indicates a characteristic of an uplink signal or an indication to perform cancellation of interference corresponding to the uplink signal, receiving, from a third network node, a downlink signal that is concurrently communicated with the uplink signal, where only one of: the second network node is the third network node, or the uplink signal is communicated by the second network node and the second network node is different from the third network node, and performing cancellation of the interference corresponding to the uplink signal based on at least one of: the characteristic of the uplink signal or the indication.

An apparatus is described. The apparatus may include at least one processor, memory coupled with the processor, and memory communicatively coupled to the at least one processor. The at least one processor may be configured to receive, from a second network node, at least one of: signaling that indicates a characteristic of an uplink signal or an indication to perform cancellation of interference corresponding to the uplink signal, receive, from a third network node, a downlink signal that is concurrently communicated with the uplink signal, where only one of: the second network node is the third network node, or the uplink signal is communicated by the second network node and the second network node is different from the third network node, and perform cancellation of the interference corresponding to the uplink signal based on at least one of: the characteristic of the uplink signal or the indication.

Another apparatus is described. The apparatus may include means for receiving, from a second network node, at least one of: signaling that indicates a characteristic of an uplink signal or an indication to perform cancellation of interference corresponding to the uplink signal, means for receiving, from a third network node, a downlink signal that is concurrently communicated with the uplink signal, where only one of: the second network node is the third network node, or the uplink signal is communicated by the second network node and the second network node is different from the third network node, and means for performing cancellation of the interference corresponding to the uplink signal based on at least one of: the characteristic of the uplink signal or the indication.

A non-transitory computer-readable medium storing code is described. The code may include instructions executable by a processor to receive, from a second network node, at least one of: signaling that indicates a characteristic of an uplink signal or an indication to perform cancellation of interference corresponding to the uplink signal, receive, from a third network node, a downlink signal that is concurrently communicated with the uplink signal, where only one of: the second network node is the third network node, or the uplink signal is communicated by the second network node and the second network node is different from the third network node, and perform cancellation of the interference corresponding to the uplink signal based on at least one of: the characteristic of the uplink signal or the indication.

In some examples of the method, apparatuses, and non-transitory computer-readable medium described herein, the characteristic of the uplink signal includes a bandwidth for performing the cancellation of the interference corresponding to the uplink signal.

In some examples of the method, apparatuses, and non-transitory computer-readable medium described herein, the uplink signal may be transmitted by a fourth network node and the second network node may be the third network node.

In some examples of the method, apparatuses, and non-transitory computer-readable medium described herein, the indication to perform the cancellation of the interference is based on at least one of: a time resource allocation for the uplink signal, a frequency resource allocation for the uplink signal, or an amount of data buffered for the uplink signal.

In some examples of the method, apparatuses, and non-transitory computer-readable medium described herein, performing the cancellation of the interference corresponding to the uplink signal may include operations, features, means, or instructions for estimating the interference corresponding to the uplink signal based on the characteristic of the uplink signal and subtracting the estimated interference from the downlink signal.

In some examples of the method, apparatuses, and non-transitory computer-readable medium described herein, the characteristic of the uplink signal includes a modulated signal carrying a baseband of the uplink signal.

In some examples of the method, apparatuses, and non-transitory computer-readable medium described herein, the characteristic of the uplink signal includes a resource allocation for the uplink signal, a transmit beam corresponding to the uplink signal, an MCS corresponding to the uplink signal, a transmit power corresponding to the uplink signal, or any combination thereof.

A method is described. The method may include transmitting, to a first victim network node, at least one of: signaling that indicates a characteristic of an uplink signal or an indication to perform cancellation of interference corresponding to the uplink signal and transmitting the uplink signal to a third network node or receive the uplink signal from the third network node, where the uplink signal is concurrently communicated with a downlink signal transmitted to the first victim network node, and where the uplink signal is associated with interference at the first victim network node.

An apparatus is described. The apparatus may include at least one processor, memory coupled with the processor, and memory communicatively coupled to the at least one processor. The at least one processor may be configured to transmit, to a first victim network node, at least one of: signaling that indicates a characteristic of an uplink signal or an indication to perform cancellation of interference corresponding to the uplink signal and transmit the uplink signal to a third network node or receive the uplink signal from the third network node, where the uplink signal is concurrently communicated with a downlink signal transmitted to the first victim network node, and where the uplink signal is associated with interference at the first victim network node.

Another apparatus is described. The apparatus may include means for transmitting, to a first victim network node, at least one of: signaling that indicates a characteristic of an uplink signal or an indication to perform cancellation of interference corresponding to the uplink signal and means for transmitting the uplink signal to a third network node or receive the uplink signal from the third network node, where the uplink signal is concurrently communicated with a downlink signal transmitted to the first victim network node, and where the uplink signal is associated with interference at the first victim network node.

A non-transitory computer-readable medium storing code is described. The code may include instructions executable by a processor to transmit, to a first victim network node, at least one of: signaling that indicates a characteristic of an uplink signal or an indication to perform cancellation of interference corresponding to the uplink signal and transmit the uplink signal to a third network node or receive the uplink signal from the third network node, where the uplink signal is concurrently communicated with a downlink signal transmitted to the first victim network node, and where the uplink signal is associated with interference at the first victim network node.

Some examples of the method, apparatuses, and non-transitory computer-readable medium described herein may further include operations, features, means, or instructions for transmitting, to the first victim network node, the downlink signal, where the downlink signal may be associated with full-duplex communications between the second network node and the first victim network node and between the second network node and the third network node.

In some examples of the method, apparatuses, and non-transitory computer-readable medium described herein, the characteristic of the uplink signal includes a bandwidth for performing cancellation of the interference corresponding to the uplink signal.

In some examples of the method, apparatuses, and non-transitory computer-readable medium described herein, the uplink signal may be transmitted from the third network node to the second network node or from the second network node to the third network node.

In some examples of the method, apparatuses, and non-transitory computer-readable medium described herein, the indication to perform the cancellation of the interference may be based on a time resource allocation for the uplink signal at least partially overlapping with a time resource allocation for the downlink signal.

In some examples of the method, apparatuses, and non-transitory computer-readable medium described herein, the indication to perform the cancellation of the interference may be based on a frequency resource allocation for the uplink signal at least partially overlapping with a frequency resource allocation for the downlink signal.

In some examples of the method, apparatuses, and non-transitory computer-readable medium described herein, the indication to perform the cancellation of the interference may be based on an amount of data buffered for the uplink signal satisfying a threshold.

In some examples of the method, apparatuses, and non-transitory computer-readable medium described herein, the characteristic of the uplink signal includes a modulated signal carrying a baseband of the uplink signal.

In some examples of the method, apparatuses, and non-transitory computer-readable medium described herein, the characteristic of the uplink signal includes a resource allocation for the uplink signal, a transmit beam corresponding to the uplink signal, an MCS corresponding to the uplink signal, a transmit power corresponding to the uplink signal, or any combination thereof.

DETAILED DESCRIPTION

Figure 1:
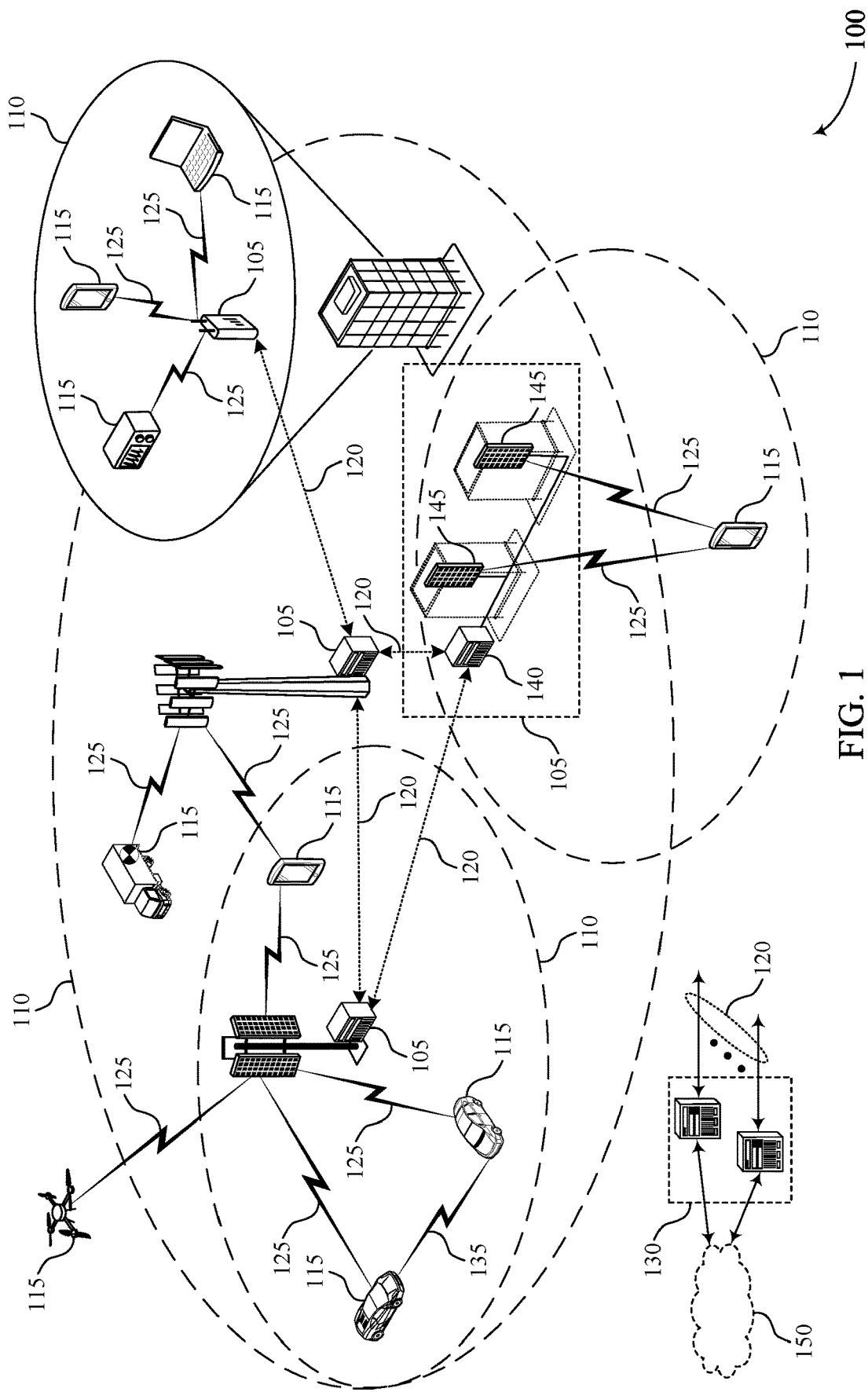
FIG. 1 illustrates an example of a wireless communications system that supports signal estimation for interference cancellation in accordance with aspects of the present disclosure.

A first user equipment (UE) may, in some cases, experience interference generated by communications at a second UE. For example, a base station may operate in a full-duplex communications mode, in which the base station may transmit one or more downlink signals to first UE at least partially overlapping with reception of one or more uplink signals from the second UE at the base station. Additionally or alternatively, the first UE may receive one or more downlink signals from the base station (e.g., or a transmission/reception point (TRP)) at least partially overlapping with transmission of one or more uplink signals from the second UE to a second base station (e.g., or a second TRP). It is to be understood that, while some examples herein describe concurrent communications in a full-duplex mode, the same examples may also apply to other situations in which uplink and downlink transmissions at least partially overlap (e.g., concurrent transmissions associated with different base stations or TRPs).

An uplink signal transmitted by the second UE may thus be received as interference at the first UE. In such cases, the second UE may be referred to as an aggressor UE and the first UE may be referred to as a victim UE. The interference may reduce downlink signal quality at the first UE, which may, in some cases, increase a quantity of errors in downlink transmissions received by the first UE or decrease a likelihood of successfully decoding a downlink message at the first UE. Cancellation of such interference may be performed by using a clean baseband of the interfering uplink signal to estimate the interference associated with the uplink signal, where the first UE may subtract the estimated interference from a received downlink signal (e.g., to cancel the interference). As described herein, performing cancellation of interference (e.g., attempting to perform cancellation of interference) may refer to or include partial or full mitigation of the interference, reduction of the interference, or attenuation of the interference, among other examples.

In some cases, the baseband of the interfering signal may be unknown to the first UE, such that the first UE may be unable to estimate the interference associated with the uplink signal, or may do so inaccurately, which may reduce downlink signal quality at the first UE.

The present disclosure provides techniques for estimating interference for concurrent uplink and downlink communications based on an indication of one or more one or more characteristics of an interfering uplink signal. For example, the base station, the second UE, or both, may transmit, to the first UE, an indication of a resource allocation of the uplink signal, a transmit beam of the uplink signal, a modulation coding scheme (MCS) of the uplink signal, a transmit power of the uplink signal, or any combination thereof. Additionally or alternatively, the second UE or the base station may transmit an indication of a baseband of the uplink signal to the first UE.

The first UE may use the characteristic(s) of the uplink signal included in the indication (e.g., information regarding the uplink signal, baseband of the uplink signal, or any combination thereof) to estimate the baseband of the uplink signal. The first UE may use the baseband of the uplink signal to cancel interference associated with the uplink signal. For example, the first UE may use the baseband signal to estimate the interference and may subtract the estimated interference from a downlink signal received at the first UE, where the received signal may include a downlink signal transmitted to the first UE and the interference from the uplink signal. Based on performing the interference cancellation, the first UE may experience an increased signal quality for downlink communications.

Aspects of the disclosure are initially described in the context of wireless communications systems. Aspects of the disclosure are further illustrated by and described with reference to a resource allocation scheme, an interference cancellation scheme, a process flow, apparatus diagrams, system diagrams, and flowcharts that relate to signal estimation for interference cancellation.

FIG. 1 illustrates an example of a wireless communications system 100 that supports signal estimation for interference cancellation in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105.

In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_S=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

A base station 105, a second UE 115, or both, may transmit, to a first UE 115, an indication of one or more characteristics of an interfering uplink signal communicated between second UE 115 and the base station 105. The first UE 115 may use the characteristic(s) of the uplink signal included in the indication to estimate a baseband of the uplink signal. The first UE 115 may use the baseband of the uplink signal to cancel interference associated with the uplink signal. For example, the first UE 115 may use the baseband signal to estimate the interference and may subtract the estimated interference from a downlink signal received at the first UE 115, where the received signal may include a downlink signal transmitted to the first UE 115 and the interference from the uplink signal.

Figure 2:
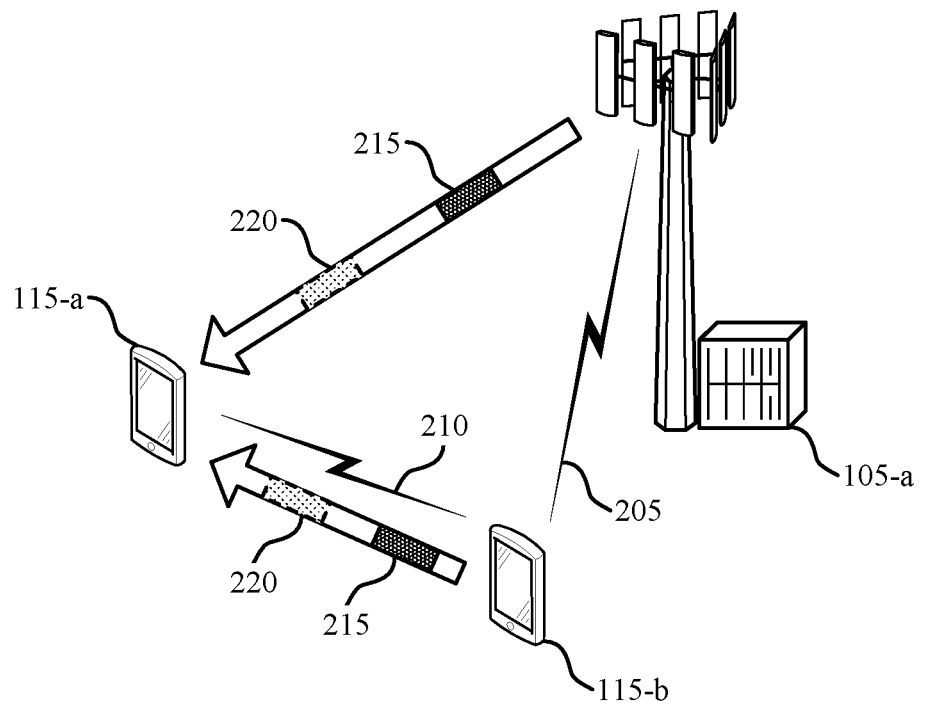
FIG. 2 illustrates an example of a wireless communications system that supports signal estimation for interference cancellation in accordance with aspects of the present disclosure.

FIG. 2 illustrates an example of a wireless communications system 200 that supports signal estimation for interference cancellation in accordance with aspects of the present disclosure. In some examples, wireless communications system 200 may implement or be implemented by one or more aspects of wireless communications system 100. For example, wireless communications system 200 may include a base station 105-a and UEs 115-a and 115-b, which may be examples of a base station 105 and respective UEs 115 described with reference to FIG. 1. In some cases, base station 105-a may operate in a full-duplex mode when communicating with UEs 115-*a* and 115-*b*. For example, in the full-duplex communications mode, base station 105-*a* may transmit one or more downlink signals to UE 115-*a* at least partially overlapping with reception of one or more uplink signals 205 from UE 115-*b* (e.g., base station 105-*a* may concurrently perform downlink and uplink communications).

In some cases, UE 115-*a* may additionally or alternatively receive one or more downlink signals a first base station 105 (e.g., base station 105-*a*), or a first TRP, at least partially overlapping (e.g., concurrently) with transmission of one or more uplink signals from UE 115-*b* to a second base station 105 or a second TRP. It is to be understood that, while some examples herein describe overlapping (e.g., concurrent) communications in a full-duplex mode, the same examples may also apply to other situations in which uplink and downlink transmissions may overlap for UEs 115-*a* and 115-*b* (e.g., such as transmissions associated with different base stations 105 or TRPs).

When communicating in the full-duplex mode, the downlink and uplink transmissions may share at least some time and frequency resources (e.g., same time resources and a same frequency band or sub-band). In such cases, the uplink signal(s) 205 transmitted by UE 115-*b* may, in some cases (e.g., if UEs 115-*a* and 115-*b* are within a range or distance of each other), be received as interference 210 at UE 115-*a* (e.g., interference with the concurrently received downlink signal(s)). When interference 210 is propagated by UE 115-*b* and received by UE 115-*a*, UE 115-*b* may be referred to as an aggressor UE 115 and UE 115-*a* may be referred to as a victim UE 115. The interference 210 may reduce downlink signal quality at UE 115-*a*, which may, in some cases, increase a quantity of errors in downlink transmissions received by UE 115-*a* or decrease a likelihood of successfully decoding a downlink message at UE 115-*a*.

Such inter-UE interference may share one or more qualities of UE self-interference. For example, similar to self-interference, cancellation of the inter-UE interference (e.g., interference 210) for full-duplex communications may be associated with a higher complexity compared to other interference cancellation because of non-linearities (e.g., non-linearities in a transmit path) imposed by a power amplifier, other sources in the channel, and/or at a receiver (e.g., a receiver of UE 115-*a*). In such cases, cancellation of the interference may be performed by estimating the non-linearities, and using the non-linear model (e.g., the estimated non-linearities), along with a clean baseband of the interfering uplink signal 205, to estimate the interference associated with the uplink signal 205.

As described herein, a baseband of a signal may represent symbols (e.g., pure symbols) generated by a precoder (e.g., output by the precoder) for transmission via the signal. For example, a transmitter of a UE 115 may include a precoder that generates the symbols, and the baseband of the signal (e.g., a baseband signal) may include the symbols before the symbols are further processed by the transmitter (e.g., before the signal is transformed to an analog domain, before the signal is amplified, before the signal is transmitted via one or more antennas).

The estimated interference may be subtracted from a received signal at UE 115-*a*, where the received signal may include a downlink signal transmitted to UE 115-*a* and the interference 210 experienced by UE 115-*a*. Subtracting the interference 210 from the received signal may increase a downlink signal quality at UE 115-*a*, for example, by reducing or eliminating the interference 210 from the received signal. However, in some cases, the baseband of the interfering signal 205 may be unknown to UE 115-*a* (e.g., because UE 115-*a* is not transmitting or receiving the signal 205, except as interference 210). As such, UE 115-*a* may be unable to use the non-linear model to estimate the interference associated with the uplink signal 205, or may do so inaccurately, which may reduce downlink signal quality at UE 115-*a*.

The present disclosure provides techniques for estimating interference 210 for concurrent uplink and downlink communications based on an indication 215 of one or more one or more characteristics of the uplink signal 205. For example, base station 105-*a*, UE 115-*b*, or both, may transmit, to UE 115-*a*, an indication 215 of a resource allocation of the uplink signal 205 (e.g., a time and frequency allocation), a transmit beam of the uplink signal 205, an MCS of the uplink signal 205, a transmit power of the uplink signal 205, or any combination thereof.

Additionally or alternatively, UE 115-*b* may transmit an indication of a baseband of the uplink signal 205 to UE 115-*a* (e.g., may transmit the baseband of the uplink signal 205 to UE 115-*a*). The baseband of the uplink signal 205 (e.g., a baseband signal) may be used, for example, in scenarios where UEs 115-*a* and 115-*b* are located close to each other (e.g., within a threshold distance, such that UEs 115-*a* and 115-*b* may function similar to a distributed MIMO system). In some cases, UE 115-*b* may transmit the baseband of the uplink signal 205 based on interference 210 (e.g., between UE 115-*b* and UE 115-*a*) satisfying an interference threshold, or based on a distance between UEs 115-*a* and 115-*b* satisfying a threshold. In some cases, the indication 215 may include the baseband signal, as well as the other signal information described herein (e.g., resource allocation, transmit beam, MCS, transmit power).

If base station 105-*a* transmits the indication 215, base station 105-*a* may transmit the indication 215 to UE 115-*a* via dynamic signaling (e.g., via a downlink control information (DCI) or a MAC control element (CE)), or via control signaling (e.g., an RRC configuration). If UE 115-*b* transmits the indication 215, UE 115-*b* may transmit the indication 215 to UE 115-*a* via a sidelink channel, among other examples.

UE 115-*a* may use the characteristic(s) of the uplink signal 205 included in the indication 215 (e.g., information regarding the uplink signal 205, baseband of the uplink signal 205) to estimate the baseband of the uplink signal 205. UE 115-*a* may use the baseband of the uplink signal 205 to perform interference cancellation of the interference 210 associated with the uplink signal 205. For example, UE 115-*a* may use the baseband signal to estimate the interference 210 by adjusting the baseband signal according to a determined, or indicated, non-linear model. UE 115-*a* may subtract the estimated interference from a signal received at UE 115-*a*, where the signal may include a downlink signal transmitted to UE 115-*a* and interference 210.

In some cases, UE 115-*b* and/or base station 105-*a* may also transmit an indication of a bandwidth, or a frequency range, on which UE 115-*a* is to perform interference cancellation. For example, if the interference 210 may be experienced by UE 115-*b* over some frequencies, but not other frequencies, UE 115-*b* and/or base station 105-*a* may indicate frequencies on which to perform the interference cancellation (e.g., frequencies experiencing higher interference), such as via the indication 215 (e.g., or via another signal or indication).

In some cases, even if base station 105-*a* is operating in a full-duplex communications mode, UE 115-*a* may not experience interference (e.g., significant interference) from UE 115-b. For example, UE 115-a may not experience significant interference if a frequency domain allocation for the uplink signal 205 from UE 115-b is outside of a range (e.g., sufficiently separated) from a frequency domain allocation for downlink transmissions to UE 115-a. In some cases, UE 115-b may not have any active transmissions scheduled during reception of downlink signals at UE 115-a (e.g., downlink reception at UE 115-a and uplink transmission at UE 115-b may not overlap), or UE 115-b may not have enough data for transmission on an uplink configured grant (e.g., a quantity of data in a buffer may be below a threshold).

In such cases, or in other similar cases with lower or no interference, UE 115-a may experience relatively higher signal quality and may therefore conserve power by refraining from performing interference cancellation. For example, base station 105-a, UE 115-b, or both may transmit an indication 220, which may indicate whether UE 115-a is to perform the interference cancellation. The indication 220 of whether or not to perform the interference cancellation may be based, for example, on the frequency domain allocation for the uplink signal 205 (e.g., if the frequency allocation is within a range of the frequency allocation of the downlink signal for UE 115-a), a time domain allocation for the uplink signal 205 (e.g., if the time domain allocation overlaps with that of the downlink signal), or an amount of data buffered at UE 115-b (e.g., if the amount satisfies a threshold).

The indication 220, in some examples, may be transmitted prior to the indication 215, such that UE 115-a may determine whether or not to use the information in indication 215. In some examples, the indication 220 may be transmitted together with, or as part of, the indication 215. If base station 105-a transmits the indication 220 of whether to perform interference cancellation for a downlink signal, base station 105-a may transmit the indication 220 in a DCI scheduling the downlink signal. For example, the DCI may include a one bit indication of whether UE 115-a is to perform the interference cancellation. If UE 115-a transmits the indication 220, UE 115-b may transmit the indication 220 via a sidelink channel (e.g., to notify UE 115-a in cases where no uplink data, or a lower amount of uplink data, is available for transmission at UE 115-b).

Based on the indication 220, UE 115-a may determine whether or not to perform interference cancellation when receiving a downlink signal from base station 105-a. Additionally or alternatively, UE 115-a may determine whether or not to perform interference cancellation based on a time and frequency allocation for the uplink signal 205, as indicated via the indication 215. For example, if UE 115-a determines that a time allocated to receive a downlink signal does not overlap with a time allocated to the uplink signal 205, or if UE 115-a determines that a frequency allocated to receive the downlink signal is outside of a range (e.g., sufficiently far away) from a frequency allocated to the uplink signal 205, UE 115-a may refrain from performing the interference cancellation. Similarly, if UE 115-a determines that a time allocated to receive a downlink signal overlaps with a time allocated to the uplink signal 205, or if UE 115-a determines that a frequency allocated to receive the downlink signal within a range from (e.g., closer to) a frequency allocated to the uplink signal 205, UE 115-a may perform the interference cancellation.

When UE 115-a performs interference cancellation (e.g., for interference 210 due to the uplink signal 205), UE 115-a may use the one or more characteristics indicated via the indication 215 to estimate a baseband of the uplink signal 205, and to estimate the corresponding interference 210 associated with the uplink signal 205. Based on the estimated interference, UE 115-a may perform the interference cancellation and may experience an increased signal quality for downlink communications from base station 105-a.

Figure 3:
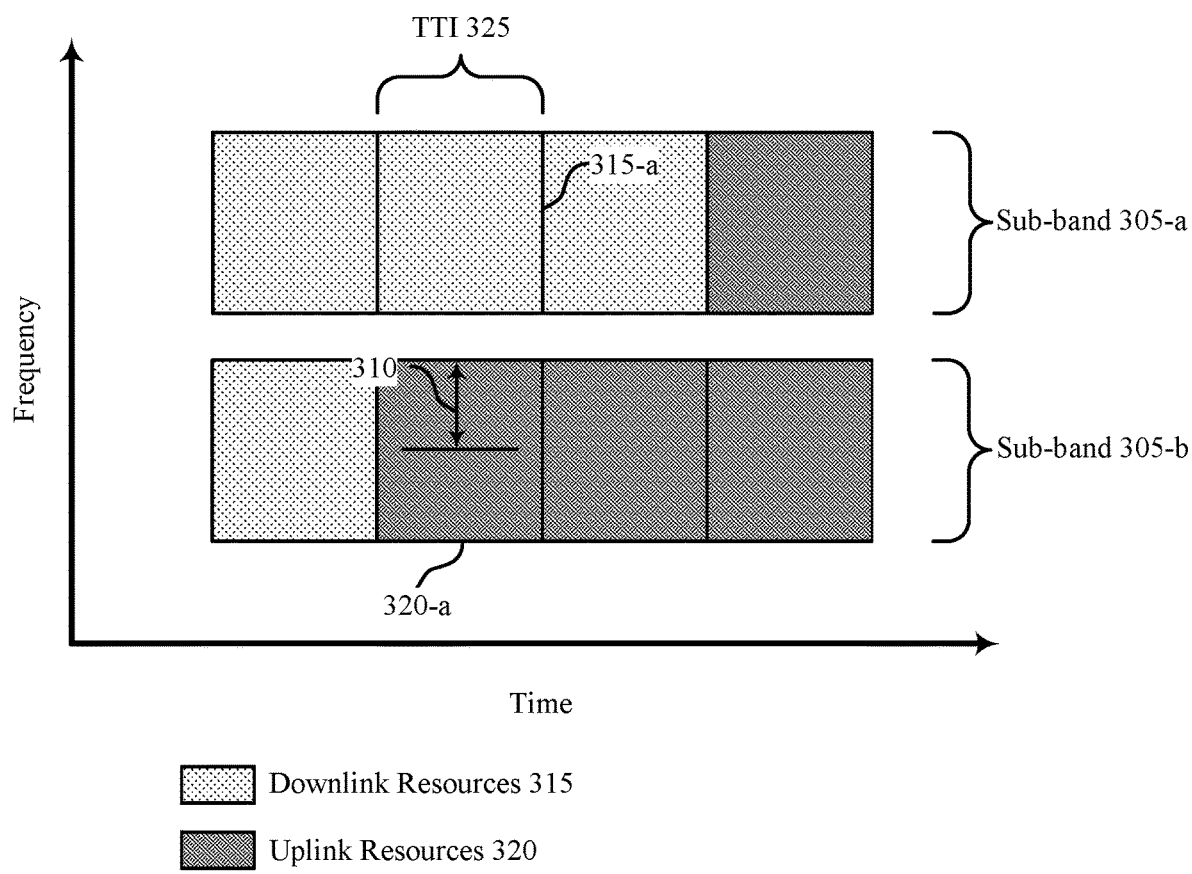
FIG. 3 illustrates an example of a resource allocation scheme that supports signal estimation for interference cancellation in accordance with aspects of the present disclosure.

FIG. 3 illustrates an example of a resource allocation scheme 300 that supports signal estimation for interference cancellation in accordance with aspects of the present disclosure. In some examples, resource allocation scheme 300 may implement or be implemented by one or more aspects of wireless communications system 100 or 200. For example, a base station 105, an aggressor UE 115, a victim UE 115, or any combination thereof, may implement one or more aspects of resource allocation scheme 300 to indicate a bandwidth 310 (e.g., frequency range) to be used for interference cancellation, or to perform interference cancellation based on the bandwidth 310. The base station 105, the aggressor UE 115, and the victim UE 115 may be examples of a base station 105 and respective UEs 115 as described with reference to FIGS. 1 and 2.

FIG. 3 may illustrate various resources for communication used by the base station 105, the aggressor UE 115, and/or the victim UE 115. For example, downlink resources 315 may be used for downlink communications between the base station 105 and the aggressor UE 115, the victim UE 115, or both. Similarly, uplink resources 320 may be used for uplink communications between the base station 105 and the aggressor UE 115, the victim UE 115, or both. The uplink resources 320 and downlink resources 315 may be included one of a frequency sub-band 305-a or a frequency sub-band 305-b, among other examples.

In some cases, the victim UE 115 and the aggressor UE 115 may be allocated resources (e.g., by the base station 105) within a same TTI 325. For example, the victim UE 115 may be allocated downlink resources 315-a and the aggressor UE 115 may be allocated uplink resources 320-a (e.g., among other possible resource allocations), which may both be within a same TTI 325. As such, an uplink signal from the aggressor UE 115 may cause interference for downlink transmissions to the victim UE 115 during the TTI 325 (e.g., as described with reference to FIG. 2).

In such cases, the aggressor UE 115, the base station 105, or both, may indicate one or more characteristics of the uplink signal to the victim UE 115, and the victim UE 115 may use the one or more characteristics of the uplink signal to estimate and cancel interference caused by the uplink signal. In some cases, a portion of the bandwidth used by the uplink signal (e.g., a portion of the sub-band 305-b) may contribute more to the interference experienced by the victim UE 115 than other portions of the bandwidth of the uplink signal. For example, resource elements (REs) closer to the bandwidth of the downlink transmissions to the victim UE 115 (e.g., sub-band 305-a) may cause more interference than other REs.

Accordingly, the base station 105, the aggressor UE 115, or both, may transmit an indication to the victim UE 115 of an effective bandwidth 310 for estimating the interference caused by the uplink signal. For example, the indication may indicate a number or range of REs, or a frequency range, which the victim UE 115 may use for estimating the interference caused by the uplink signal. The indication of the bandwidth 310 may be transmitted by the base station 105 via dynamic or semi-static signaling (e.g., DCI, MAC CE, or RRC signaling), or may be transmitted by the aggressor UE 115 via sidelink signaling. The victim UE 115 may estimate the interference caused by the uplink signal over the indicated bandwidth 310, and may use the estimated interference to cancel the interference from signaling received at the UE 115, for example, as described herein with reference to FIGS. 2 and 4.

Figure 4:
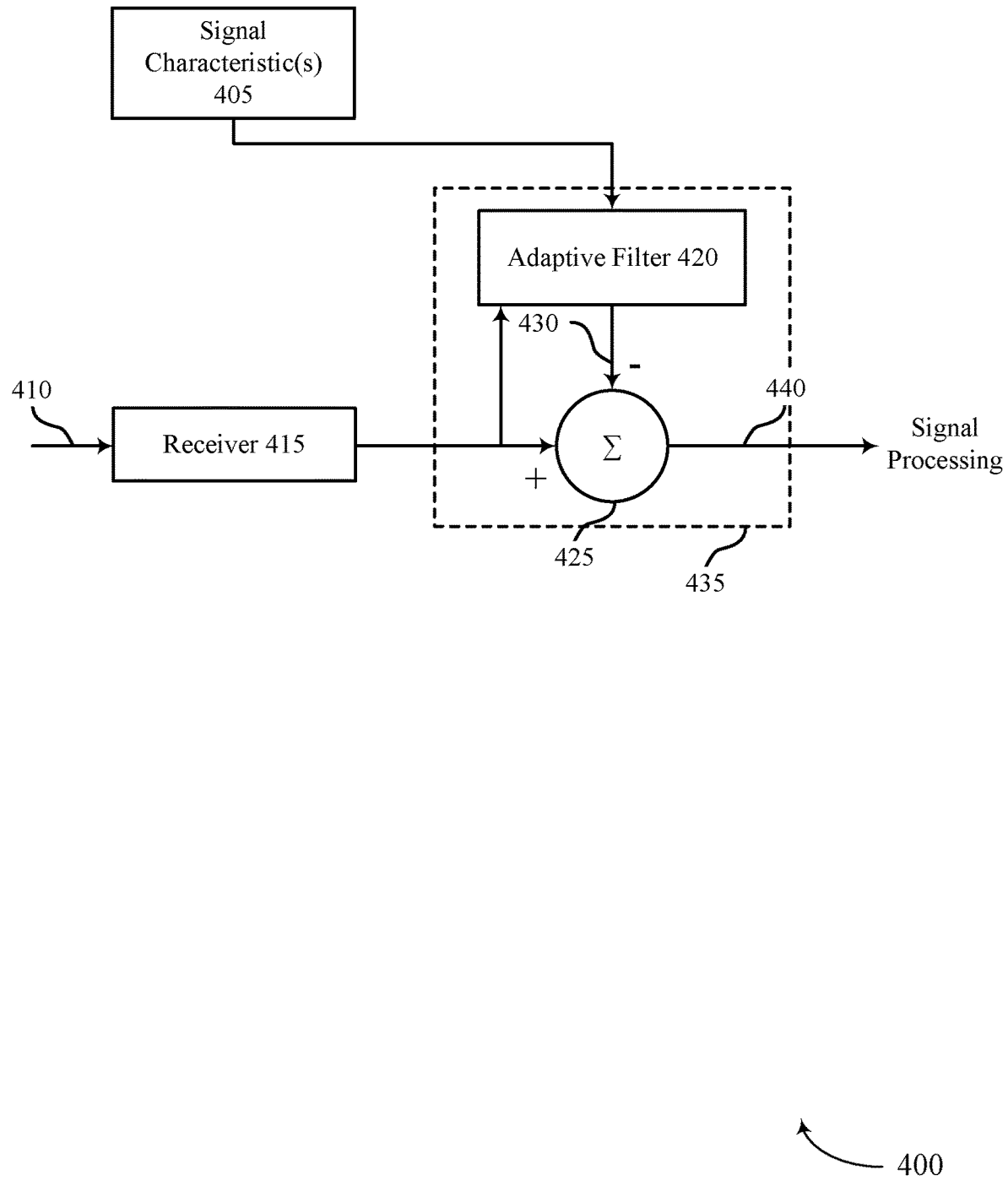
FIG. 4 illustrates an example of an interference cancellation scheme that supports signal estimation for interference cancellation in accordance with aspects of the present disclosure.

FIG. 4 illustrates an example of an interference cancellation scheme 400 that supports signal estimation for interference cancellation in accordance with aspects of the present disclosure. Interference cancellation scheme 400 may implement or be implemented by one or more aspects of wireless communications system 100 or 200. For example, interference cancellation scheme 400 may be implemented by a victim UE 115, which may be an example of a UE 115 describe with reference to FIGS. 1-3. The victim UE 115 may use interference cancellation scheme 400 to cancel interference within a received signal 410, where the received signal 410 may include a downlink signal (e.g., from a base station 105) and interference resulting from an uplink signal transmitted by an aggressor UE 115.

The interference cancellation scheme 400 may include an interference cancellation component 435 of the victim UE 115, which may be an example of hardware, software, or a combination thereof, that performs non-linear interference cancellation. The interference cancellation component 435 may receive one or more inputs, and may use the one or more inputs to estimate the interference from the uplink signal, and subtract the estimated interference from the received signal 410. For example, a receiver 415 (e.g., a receiver front end) of the victim UE 115 may receive the signal 410 and may pass the received signal 410 (e.g., before or after other performing other processing techniques) to the interference cancellation component 435. The received signal 410 may, for example, be passed to an adaptive filter 420 and a combination component 425 of the interference cancellation component 435.

Similarly, the victim UE 115 may pass one or more signal characteristics 405 of the uplink signal to the adaptive filter 420 of the interference cancellation component 435. The one or more signal characteristics 405 may be received from the base station 105, the aggressor UE 115, or both, and may, for example, include a baseband of the uplink signal (e.g., among other characteristics as described with reference to FIG. 2). In some cases, the victim UE 115 may estimate the baseband of the uplink signal using the one or more signal characteristics 405, and may pass the baseband to the adaptive filter 420.

The adaptive filter 420 may use the inputs of the received signal 410 and the signal characteristic(s) 405 to estimate interference 430 introduced to the received signal 410 by the uplink signal. For example, the adaptive filter 420 may estimate the interference 430 by modeling (e.g., or partially modeling) a non-linearity of the uplink signal (e.g., of the interference introduced by the uplink signal). In one example, the adaptive filter 420 may use a memory polynomial model to estimate the non-linear system, where the adaptive filter 420 may estimate one or more model weights for the memory polynomial model.

Once the model of the non-linear system is known or estimated, the model may be used to estimate the interference 430 for the baseband of the uplink signal. The estimated interference 430 may be output from the adaptive filter 420 (e.g., or from another component and as a result of the output of the adaptive filter 420). The estimated interference 430 and the received signal 410 may be input to the combination component 425, which may subtract the estimated interference 430 from the received signal 410 (e.g., may add a positive received signal 410 with a negative interference 430). The result of subtracting the estimated interference 430 from the received signal may be a clean (e.g., relatively clean) downlink signal 440 (e.g., as transmitted to the victim UE 115, such as by the base station 105), which may be output from the interference cancellation component 435 for further processing at the victim UE 115 (e.g., for performing a fast Fourier transform (FFT)).

Figure 5:
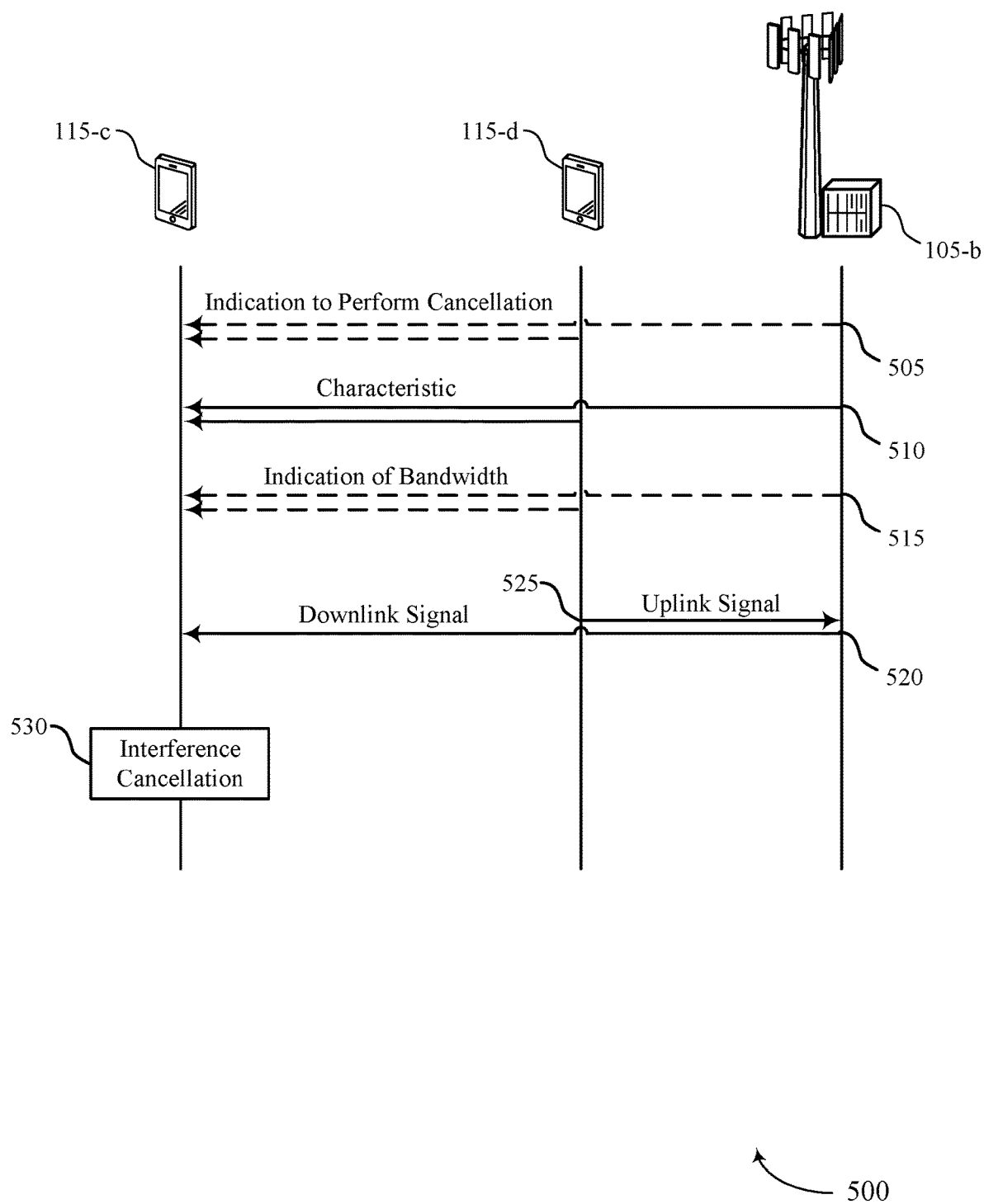
FIG. 5 illustrates an example of a process flow that supports signal estimation for interference cancellation in accordance with aspects of the present disclosure.

FIG. 5 illustrates an example of a process flow 500 that supports signal estimation for interference cancellation in accordance with aspects of the present disclosure. In some examples, some aspects of process flow 500 may implement or be implemented by aspects of wireless communications system 100 or 200. For example, process flow 500 may be implemented by a base station 105-b, and by UEs 115-c and 115-d, which may be examples of a base station 105 and respective UEs 115 described with reference to FIGS. 1-4. Base station 105-b and UEs 115-c and 115-d may implement one or more aspects of process flow 500 in order to communicate one or more characteristics of an uplink signal, for interference cancellation, as described with reference to FIGS. 1-4.

In the following description of process flow 500, the operations may be performed in a different order than the order shown, or the operations performed by UE 115-c, UE 115-d, and base station 105-b may be performed in different orders or at different times. For example, some operations may also be left out of process flow 500, or other operations may be added to process flow 500. In one example, one or more of the indications described herein may be transmitted together, or may be transmitted separately. Although UE 115-c, UE 115-d, and base station 105-b are shown performing the operations of process flow 500, some aspects of some operations may also be performed by one or more other wireless devices. For example, an uplink signal transmitted by UE 115-d may be communicated to another base station 105, or to another TRP.

At 505, in some cases, base station 105-b or UE 115-d (e.g., an aggressor UE 115) may transmit, to UE 115-c, an indication of whether to perform cancellation of interference corresponding to an uplink signal communicated by UE 115-d (e.g., with base station 105-b or with another base station 105). For example, base station 105-b or UE 115-d may transmit signaling including a one-bit indication (e.g., among other examples) of whether or not to perform the cancellation, such as described with reference to FIG. 2. In some cases, the indication of whether to perform the cancellation may be included in signaling indicating a characteristic of the uplink signal.

At 510, base station 105-b or UE 115-d may transmit, to UE 115-c, signaling that indicates a characteristic of the uplink signal communicated by UE 115-d (e.g., with base station 105-b or with another base station 105). The characteristic of the uplink signal may be for cancellation of interference corresponding to the uplink signal. For example, the characteristic may be a baseband of the uplink signal, or may be one or more other characteristics that may support estimation of the baseband, or estimation of the interference associated with the uplink signal, among other examples. In some cases, the signaling may indicate more than one characteristic of the uplink signal, which may support an increased accuracy for estimation of the baseband or the interference.

At 515, in some cases, base station 105-b or UE 115-d may transmit, to UE 115-c, an indication of a bandwidth for performing the cancellation of the interference corresponding to the uplink signal. For example, as described with reference to FIG. 3, base station 105-b or UE 115-d may indicate a frequency range, a bandwidth, one or more REs, or the like, which UE 115-c is to use for estimating the interference associated with the uplink signal. As such, the indicated bandwidth may correspond to a portion of a bandwidth that is used or occupied by the uplink signal. In some cases, the indication of the bandwidth may be included in the signaling indicating the characteristic of the uplink signal.

In some cases, base station 105-b or UE 115-d may transmit the indication to perform the cancellation of the interference based on a time resource allocation for the uplink signal at least partially overlapping with a time resource allocation for the downlink signal, based on a frequency resource allocation for the uplink signal at least partially overlapping with a frequency resource allocation for the downlink signal, based on an amount of data buffered for the uplink signal satisfying a threshold, or any combination thereof.

At 520, base station 105-b may transmit, to UE 115-c, a downlink signal, which may be communicated concurrently (e.g., at least partially overlapping in time) with the uplink signal.

At 525, UE 115-d may transmit, to base station 105-b or another base station 105 (e.g., or TRP), the uplink signal. The uplink signal may be communicated concurrently with the downlink signal transmitted at 520 and may be associated with interference at UE 115-c. If base station 105-b communicates the uplink signal with UE 115-d (e.g., receives the uplink signal from UE 115-d), base station 105-b may communicate the uplink signal and the downlink signal in a full-duplex mode.

At 530, UE 115-c may perform cancellation of the interference corresponding to the uplink signal based on the characteristic of the uplink signal. For example, as described herein with reference to FIGS. 2 and 4, UE 115-c may use obtain the baseband of the uplink signal from the signaling, or using the characteristic(s) indicated by the signaling (e.g., may estimate the baseband). UE 115-c may use the baseband of the uplink signal to determine or estimate the interference associated with the uplink signal (e.g., using a non-linear model to transform the baseband). UE 115-c may subtract the estimated interference from the downlink signal (e.g., from a received signal that includes the downlink signal and the interference), which may reduce or eliminate the interference from the downlink signal.

Figure 6:
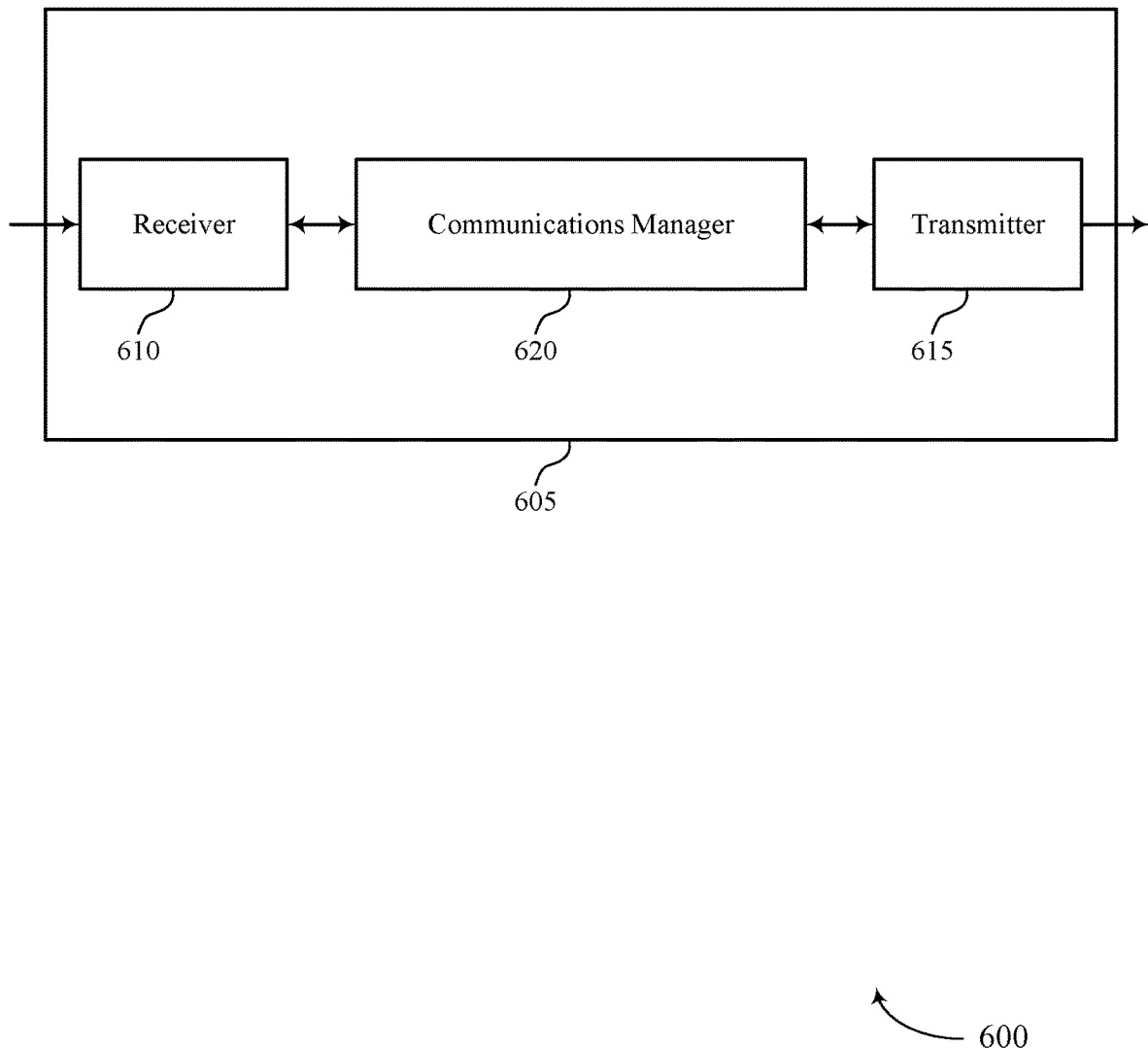
FIGS. 6 and 7 show block diagrams of devices that support signal estimation for interference cancellation in accordance with aspects of the present disclosure.

FIG. 6 shows a block diagram 600 of a device 605 that supports signal estimation for interference cancellation in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to signal estimation for interference cancellation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to signal estimation for interference cancellation). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of signal estimation for interference cancellation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

For example, the communications manager 620 may be configured as or otherwise support a means for receiving, from a second network node, at least one of: signaling that indicates a characteristic of an uplink signal or an indication to perform cancellation of interference corresponding to the uplink signal. The communications manager 620 may be configured as or otherwise support a means for receiving, from a third network node, a downlink signal that is concurrently communicated with the uplink signal, where only one of: the second network node is the third network node, or the uplink signal is communicated by the second network node and the second network node is different from the third network node. The communications manager 620 may be configured as or otherwise support a means for performing cancellation of the interference corresponding to the uplink signal based on at least one of: the characteristic of the uplink signal or the indication.

For example, the communications manager 620 may be configured as or otherwise support a means for transmitting, to a first victim network node, at least one of: signaling that indicates a characteristic of an uplink signal or an indication to perform cancellation of interference corresponding to the uplink signal. The communications manager 620 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

The actions performed by the communications manager 620, among other examples herein, may be implemented to realize one or more potential advantages. For example, communications manager 620 may increase available battery power and communication quality at a wireless device (e.g., a UE 115) by supporting interference cancellation at the wireless device, which may increase communication quality at the wireless device by decreasing interference. The associated increase in communication quality may result in increased link performance and decreased overhead based on performing the interference cancellation. Accordingly, communications manager 620 may save power and increase battery life at a wireless device (e.g., a UE 115) by strategically increasing a quality of communications at a wireless device (e.g., a UE 115).

Figure 7:
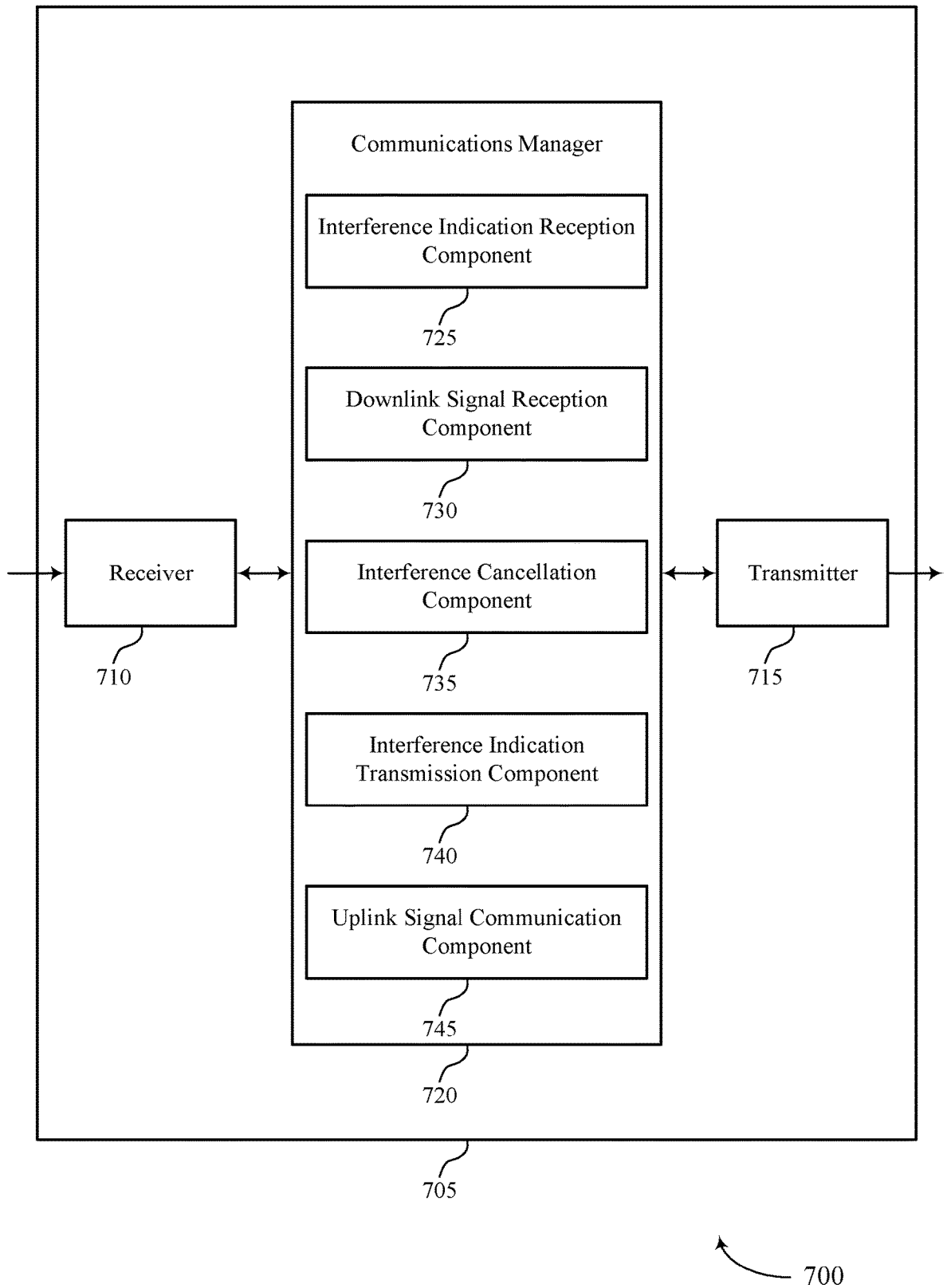

FIG. 7 shows a block diagram 700 of a device 705 that supports signal estimation for interference cancellation in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to signal estimation for interference cancellation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to signal estimation for interference cancellation). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of signal estimation for interference cancellation as described herein. For example, the communications manager 720 may include an interference indication reception component 725, a downlink signal reception component 730, an interference cancellation component 735, an interference indication transmission component 740, an uplink signal communication component 745, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The interference indication reception component 725 may be configured as or otherwise support a means for receiving, from a second network node, at least one of: signaling that indicates a characteristic of an uplink signal or an indication to perform cancellation of interference corresponding to the uplink signal. The downlink signal reception component 730 may be configured as or otherwise support a means for receiving, from a third network node, a downlink signal that is concurrently communicated with the uplink signal, where only one of: the second network node is the third network node, or the uplink signal is communicated by the second network node and the second network node is different from the third network node. The interference cancellation component 735 may be configured as or otherwise support a means for performing cancellation of the interference corresponding to the uplink signal based on at least one of: the characteristic of the uplink signal or the indication.

The interference indication transmission component 740 may be configured as or otherwise support a means for transmitting, to a first victim network node, at least one of: signaling that indicates a characteristic of an uplink signal or an indication to perform cancellation of interference corresponding to the uplink signal. The uplink signal communication component 745 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

A processor of a wireless device (e.g., controlling the receiver 710, the transmitter 715, or the transceiver 915 as described with reference to FIG. 9) may increase available battery power and communication quality. The increased communication quality may increase available battery power and throughput (e.g., via implementation of system components described with reference to FIG. 8) compared to other systems and techniques, for example, that do not support interference cancellation for concurrent transmissions. Further, the processor of the wireless device may identify one or more aspects of a characteristic of an interfering uplink signal, which may result in increased communication quality, as well as save power and increase battery life at the wireless device (e.g., by strategically supporting interference cancellation of the uplink signal), among other benefits.

Figure 8:
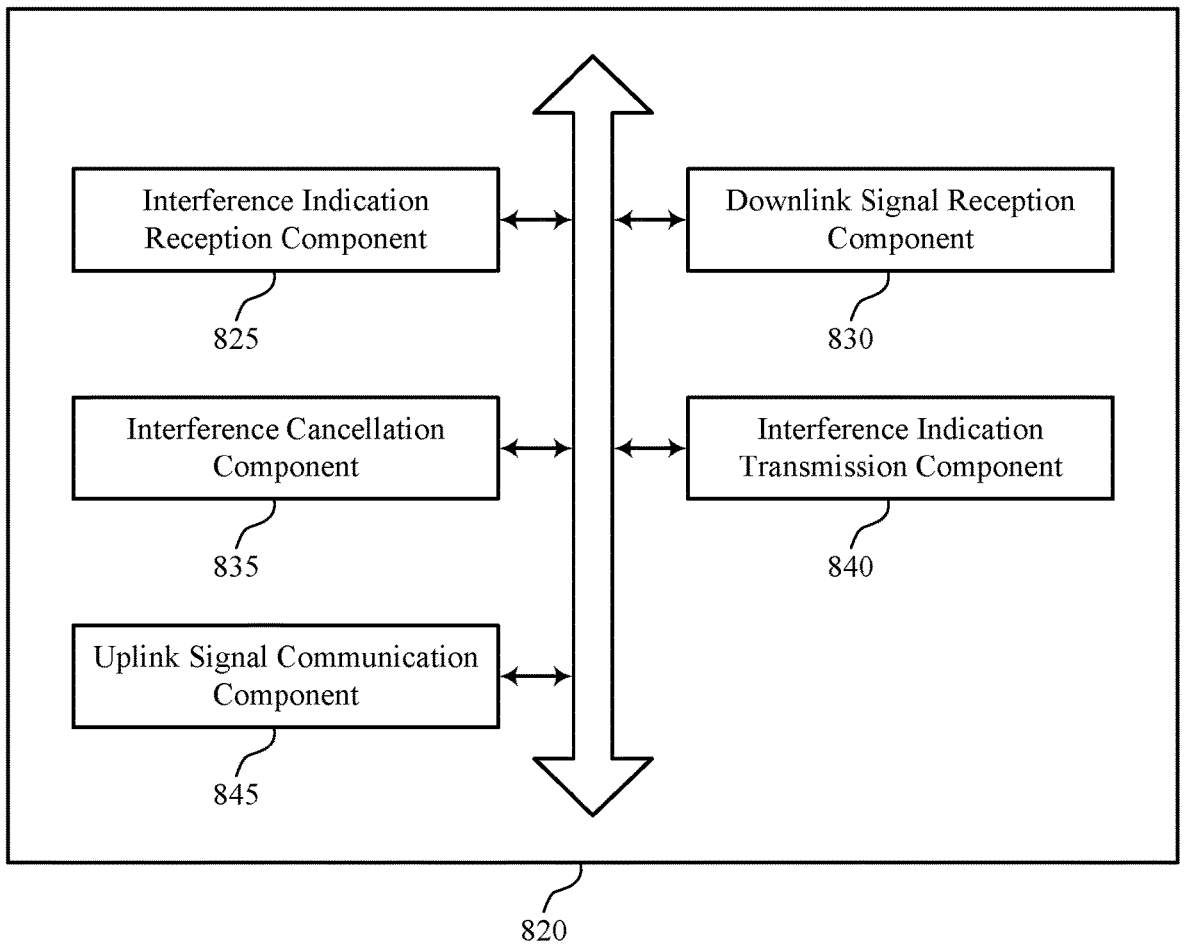
FIG. 8 shows a block diagram of a communications manager that supports signal estimation for interference cancellation in accordance with aspects of the present disclosure.

FIG. 8 shows a block diagram 800 of a communications manager 820 that supports signal estimation for interference cancellation in accordance with aspects of the present disclosure. The communications manager 820 may be an example of aspects of a communications manager 620, a communications manager 720, or both, as described herein. The communications manager 820, or various components thereof, may be an example of means for performing various aspects of signal estimation for interference cancellation as described herein. For example, the communications manager 820 may include an interference indication reception component 825, a downlink signal reception component 830, an interference cancellation component 835, an interference indication transmission component 840, an uplink signal communication component 845, a downlink signal transmission component 850, or any combination thereof. Each of these components may communicate, directly or indirectly, with one another (e.g., via one or more buses).

The interference indication reception component 825 may be configured as or otherwise support a means for receiving, from a second network node, at least one of: signaling that indicates a characteristic of an uplink signal or an indication to perform cancellation of interference corresponding to the uplink signal. The downlink signal reception component 830 may be configured as or otherwise support a means for receiving, from a third network node, a downlink signal that is concurrently communicated with the uplink signal, where only one of: the second network node is the third network node, or the uplink signal is communicated by the second network node and the second network node is different from the third network node. The interference cancellation component 835 may be configured as or otherwise support a means for performing cancellation of the interference corresponding to the uplink signal based on at least one of: the characteristic of the uplink signal or the indication.

In some examples, the characteristic of the uplink signal includes a bandwidth for performing the cancellation of the interference corresponding to the uplink signal. In some examples, the uplink signal is transmitted by a fourth network node, where the second network node is the third network node. In some examples, the indication to perform the cancellation of the interference is based on one of a time resource allocation for the uplink signal, a frequency resource allocation for the uplink signal, or an amount of data buffered for the uplink signal.

In some examples, to support performing the cancellation of the interference corresponding to the uplink signal, the interference cancellation component 835 may be configured as or otherwise support a means for estimating the interference corresponding to the uplink signal based on the characteristic of the uplink signal. In some examples, to support performing the cancellation of the interference corresponding to the uplink signal, the interference cancellation component 835 may be configured as or otherwise support a means for subtracting the estimated interference from the downlink signal.

In some examples, the characteristic of the uplink signal includes a modulated signal carrying a baseband of the uplink signal. In some examples, the characteristic of the uplink signal includes a resource allocation for the uplink signal, a transmit beam corresponding to the uplink signal, an MCS corresponding to the uplink signal, a transmit power corresponding to the uplink signal, or any combination thereof.

The interference indication transmission component 840 may be configured as or otherwise support a means for transmitting, to a first victim network node, at least one of: signaling that indicates a characteristic of an uplink signal or an indication to perform cancellation of interference corresponding to the uplink signal. The uplink signal communication component 845 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

In some examples, the characteristic of the uplink signal includes a bandwidth for performing cancellation of the interference corresponding to the uplink signal. In some examples, the uplink signal is transmitted from the third network node to the second network node or from the second network node to the third network node.

In some examples, the indication to perform the cancellation of the interference is based on a time resource allocation for the uplink signal at least partially overlapping with a time resource allocation for the downlink signal. In some examples, the indication to perform the cancellation of the interference is based on a frequency resource allocation for the uplink signal at least partially overlapping with a frequency resource allocation for the downlink signal. In some examples, the indication to perform the cancellation of the interference is based on an amount of data buffered for the uplink signal satisfying a threshold.

In some examples, the characteristic of the uplink signal includes a modulated signal carrying a baseband of the uplink signal. In some examples, the characteristic of the uplink signal includes a resource allocation for the uplink signal, a transmit beam corresponding to the uplink signal, an MCS corresponding to the uplink signal, a transmit power corresponding to the uplink signal, or any combination thereof.

Figure 9:
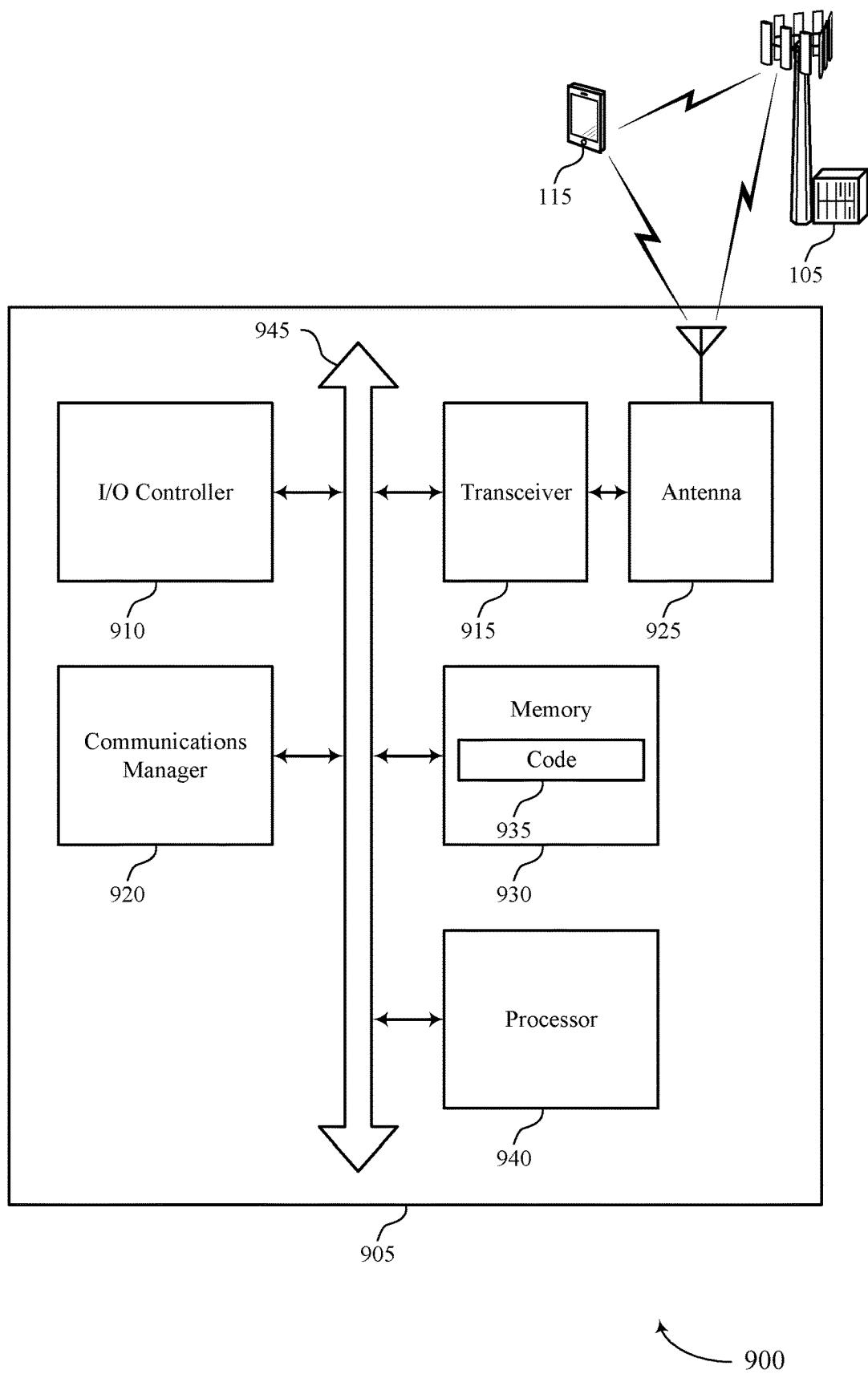
FIG. 9 shows a diagram of a system including a device that supports signal estimation for interference cancellation in accordance with aspects of the present disclosure.

FIG. 9 shows a diagram of a system 900 including a device 905 that supports signal estimation for interference cancellation in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting signal estimation for interference cancellation). For example, the device 905 or a component of the device 905 may include a processor 940 and memory 930 coupled to the processor 940, the processor 940 and memory 930 configured to perform various functions described herein.

For example, the communications manager 920 may be configured as or otherwise support a means for receiving, from a second network node, at least one of: signaling that indicates a characteristic of an uplink signal or an indication to perform cancellation of interference corresponding to the uplink signal. The communications manager 920 may be configured as or otherwise support a means for receiving, from a third network node, a downlink signal that is concurrently communicated with the uplink signal, where only one of: the second network node is the third network node, or the uplink signal is communicated by the second network node and the second network node is different from the third network node. The communications manager 920 may be configured as or otherwise support a means for performing cancellation of the interference corresponding to the uplink signal based on at least one of: the characteristic of the uplink signal or the indication.

For example, the communications manager 920 may be configured as or otherwise support a means for transmitting, to a first victim network node, at least one of: signaling that indicates a characteristic of an uplink signal or an indication to perform cancellation of interference corresponding to the uplink signal. The communications manager 920 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of signal estimation for interference cancellation as described herein, or the processor 940 and the memory 930 may be otherwise configured to perform or support such operations.

Figure 10:
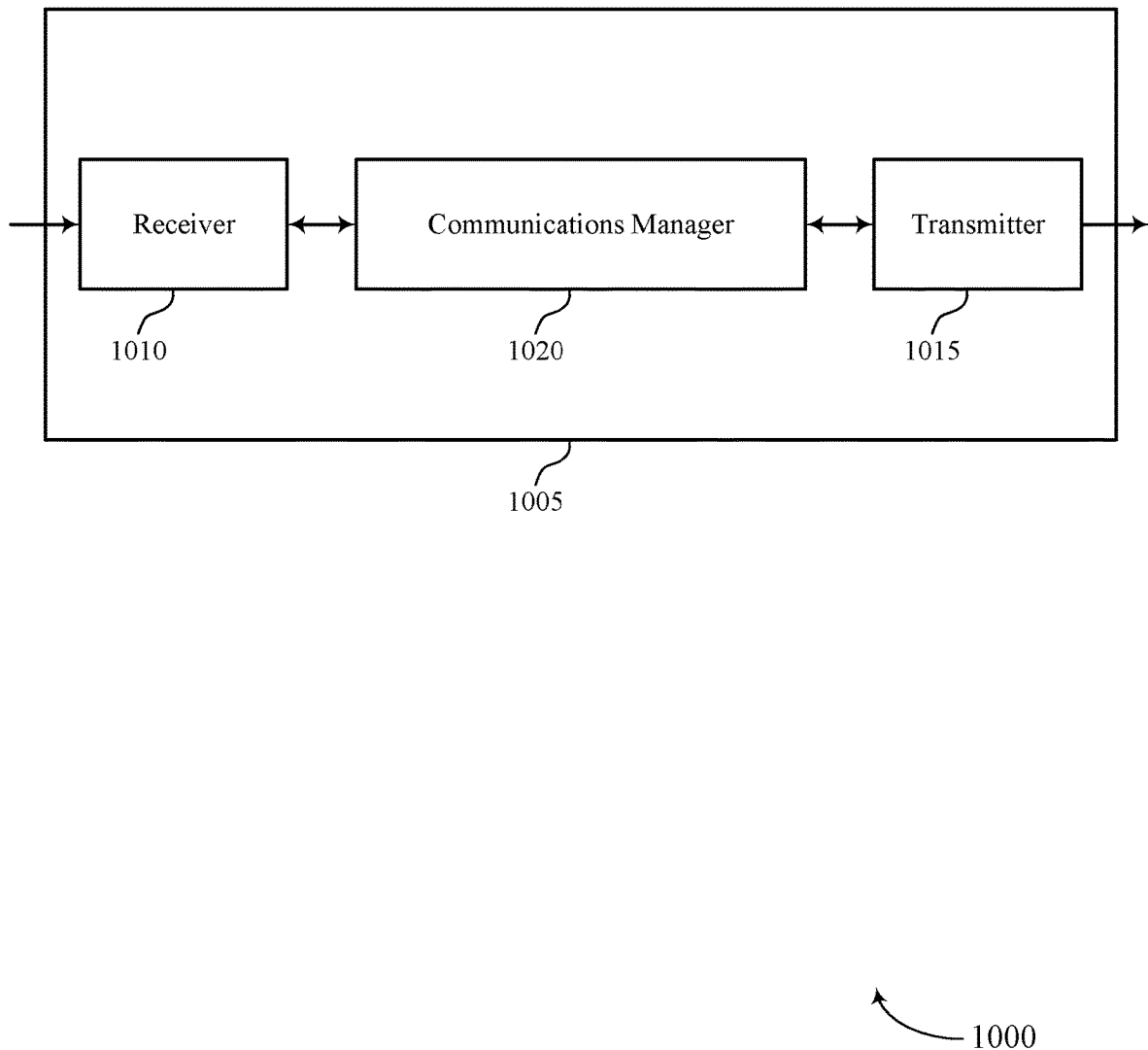
FIGS. 10 and 11 show block diagrams of devices that support signal estimation for interference cancellation in accordance with aspects of the present disclosure.

FIG. 10 shows a block diagram 1000 of a device 1005 that supports signal estimation for interference cancellation in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to signal estimation for interference cancellation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to signal estimation for interference cancellation). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of signal estimation for interference cancellation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

For example, the communications manager 1020 may be configured as or otherwise support a means for transmitting, to a first victim network node, at least one of: signaling that indicates a characteristic of an uplink signal or an indication to perform cancellation of interference corresponding to the uplink signal. The communications manager 1020 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

Figure 11:
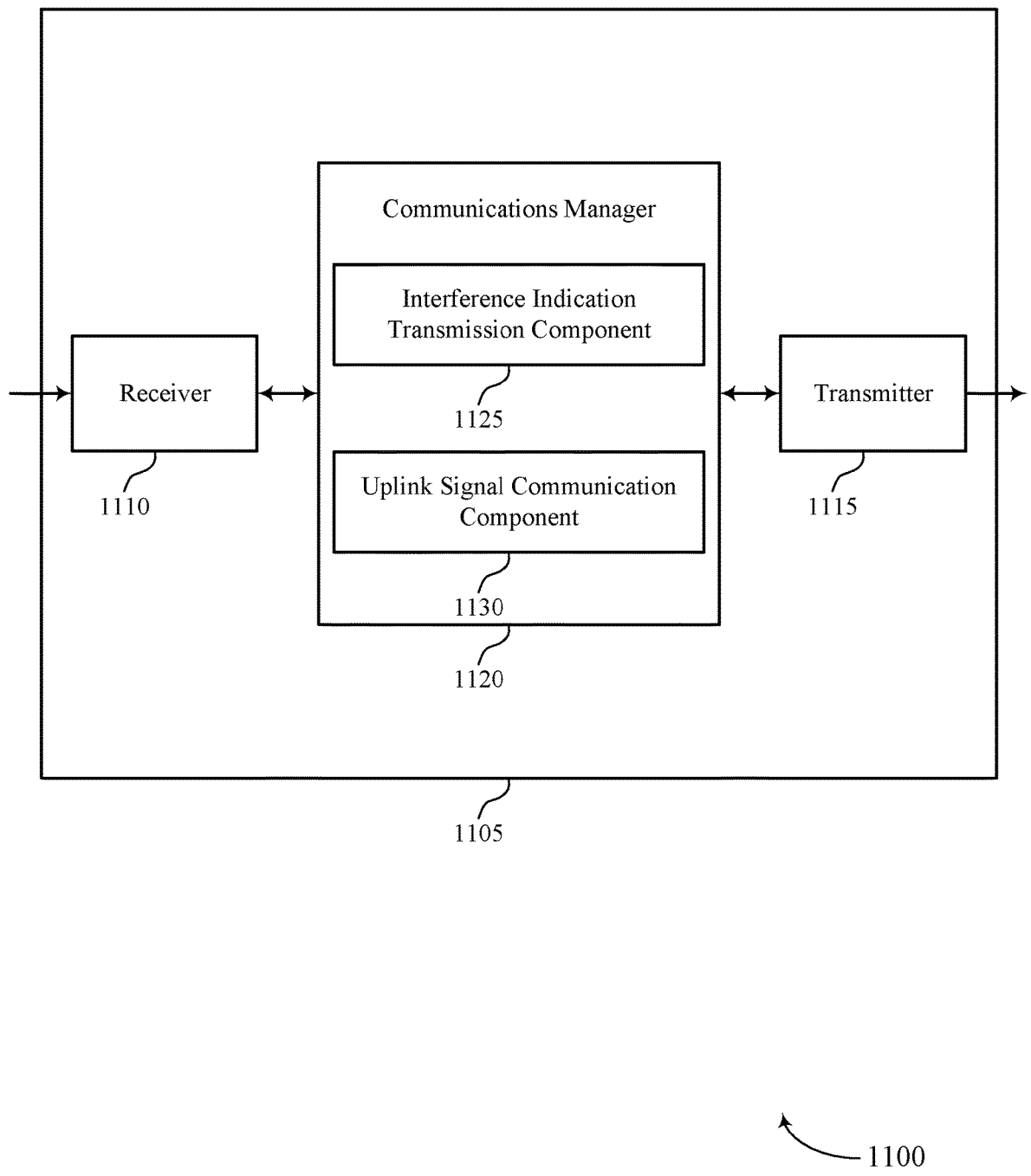

FIG. 11 shows a block diagram 1100 of a device 1105 that supports signal estimation for interference cancellation in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to signal estimation for interference cancellation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to signal estimation for interference cancellation). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of signal estimation for interference cancellation as described herein. For example, the communications manager 1120 may include an interference indication transmission component 1125 an uplink signal communication component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The interference indication transmission component 1125 may be configured as or otherwise support a means for transmitting, to a first victim network node, at least one of: signaling that indicates a characteristic of an uplink signal or an indication to perform cancellation of interference corresponding to the uplink signal. The uplink signal communication component 1130 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

Figure 12:
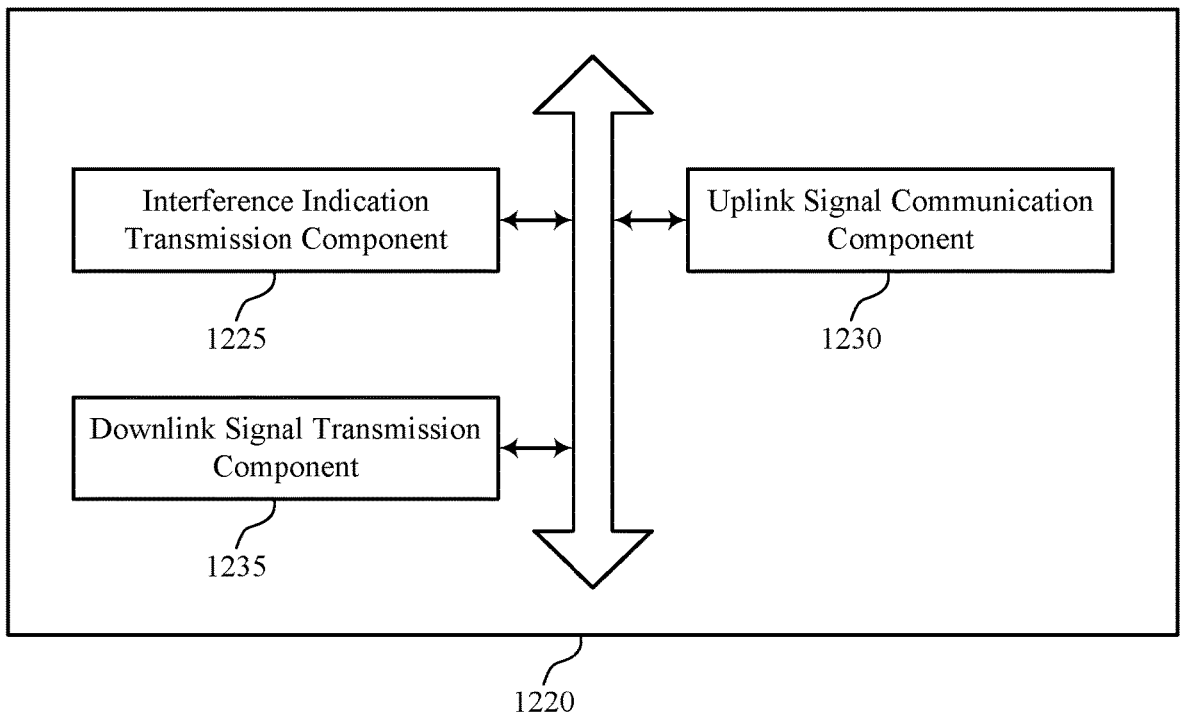
FIG. 12 shows a block diagram of a communications manager that supports signal estimation for interference cancellation in accordance with aspects of the present disclosure.

FIG. 12 shows a block diagram 1200 of a communications manager 1220 that supports signal estimation for interference cancellation in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of signal estimation for interference cancellation as described herein. For example, the communications manager 1220 may include an interference indication transmission component 1225, an uplink signal communication component 1230, a downlink signal transmission component 1235, or any combination thereof. Each of these components may communicate, directly or indirectly, with one another (e.g., via one or more buses).

The interference indication transmission component 1225 may be configured as or otherwise support a means for transmitting, to a first victim network node, at least one of: signaling that indicates a characteristic of an uplink signal or an indication to perform cancellation of interference corresponding to the uplink signal. The uplink signal communication component 1230 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

In some examples, the downlink signal transmission component 1235 may be configured as or otherwise support a means for transmitting, to the first victim network node, the downlink signal, where the downlink signal is associated with full-duplex communications between the second network node and the first victim network node and between the second network node and the third network node.

In some examples, the characteristic of the uplink signal includes a bandwidth for performing cancellation of the interference corresponding to the uplink signal. In some examples, the uplink signal is transmitted from the third network node to the second network node or from the second network node to the third network node.

In some examples, the indication to perform the cancellation of the interference is based on a time resource allocation for the uplink signal at least partially overlapping with a time resource allocation for the downlink signal. In some examples, the indication to perform the cancellation of the interference is based on a frequency resource allocation for the uplink signal at least partially overlapping with a frequency resource allocation for the downlink signal. In some examples, the indication to perform the cancellation of the interference is based on an amount of data buffered for the uplink signal satisfying a threshold.

In some examples, the characteristic of the uplink signal includes a modulated signal carrying a baseband of the uplink signal. In some examples, the characteristic of the uplink signal includes a resource allocation for the uplink signal, a transmit beam corresponding to the uplink signal, a modulation coding scheme corresponding to the uplink signal, a transmit power corresponding to the uplink signal, or any combination thereof.

Figure 13:
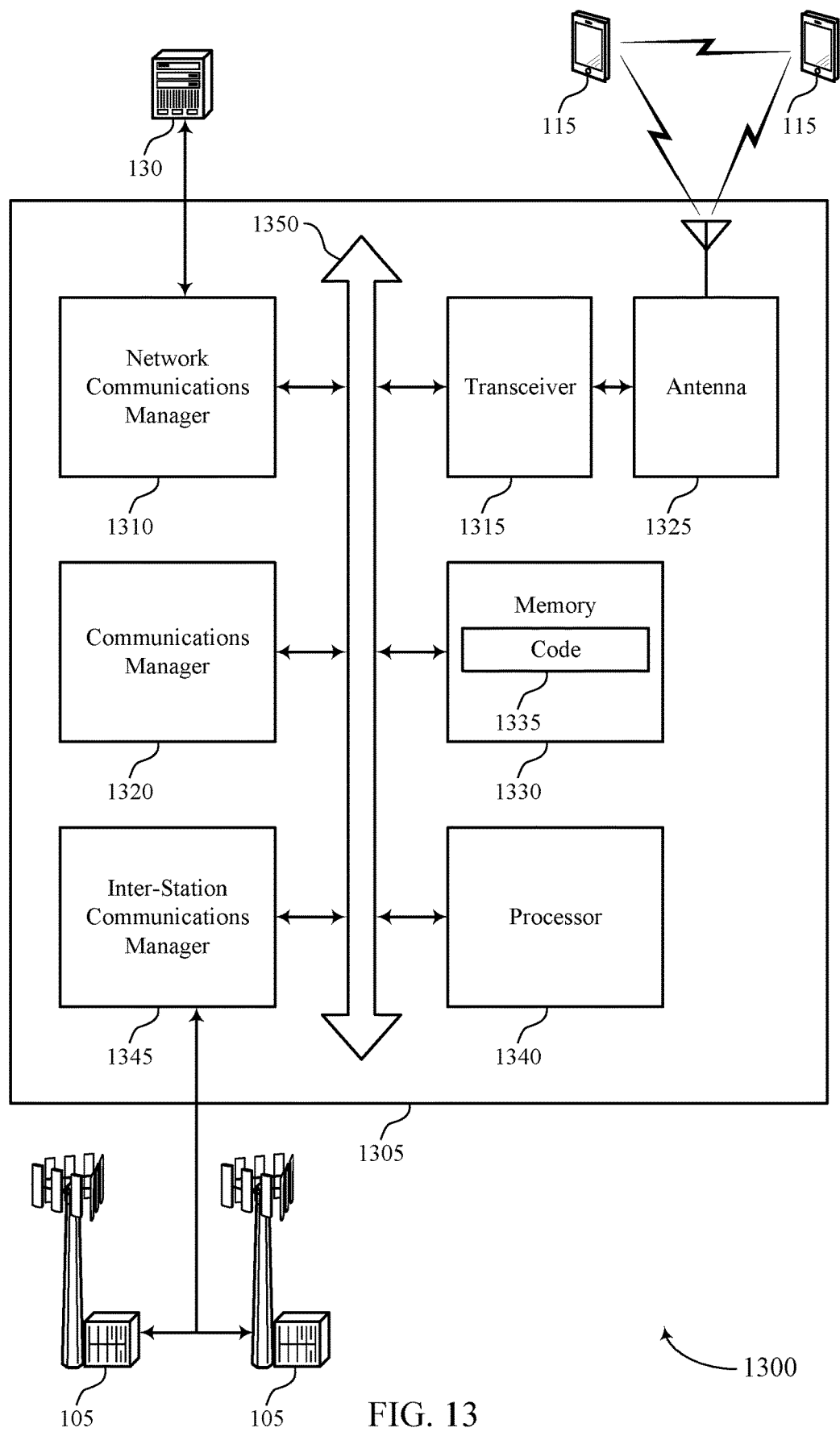
FIG. 13 shows a diagram of a system including a device that supports signal estimation for interference cancellation in accordance with aspects of the present disclosure.

FIG. 13 shows a diagram of a system 1300 including a device 1305 that supports signal estimation for interference cancellation in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting signal estimation for interference cancellation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

For example, the communications manager 1320 may be configured as or otherwise support a means for transmitting, to a first victim network node, at least one of: signaling that indicates a characteristic of an uplink signal or an indication to perform cancellation of interference corresponding to the uplink signal. The communications manager 1320 may be configured as or otherwise support a means for transmitting the uplink signal to a third network node or receive the uplink signal from the third network node, where the uplink signal is concurrently communicated with a downlink signal transmitted to the first victim network node, and where the uplink signal is associated with interference at the first victim network node.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of signal estimation for interference cancellation as described herein, or the processor 1340 and the memory 1330 may be otherwise configured to perform or support such operations.

Figure 14:
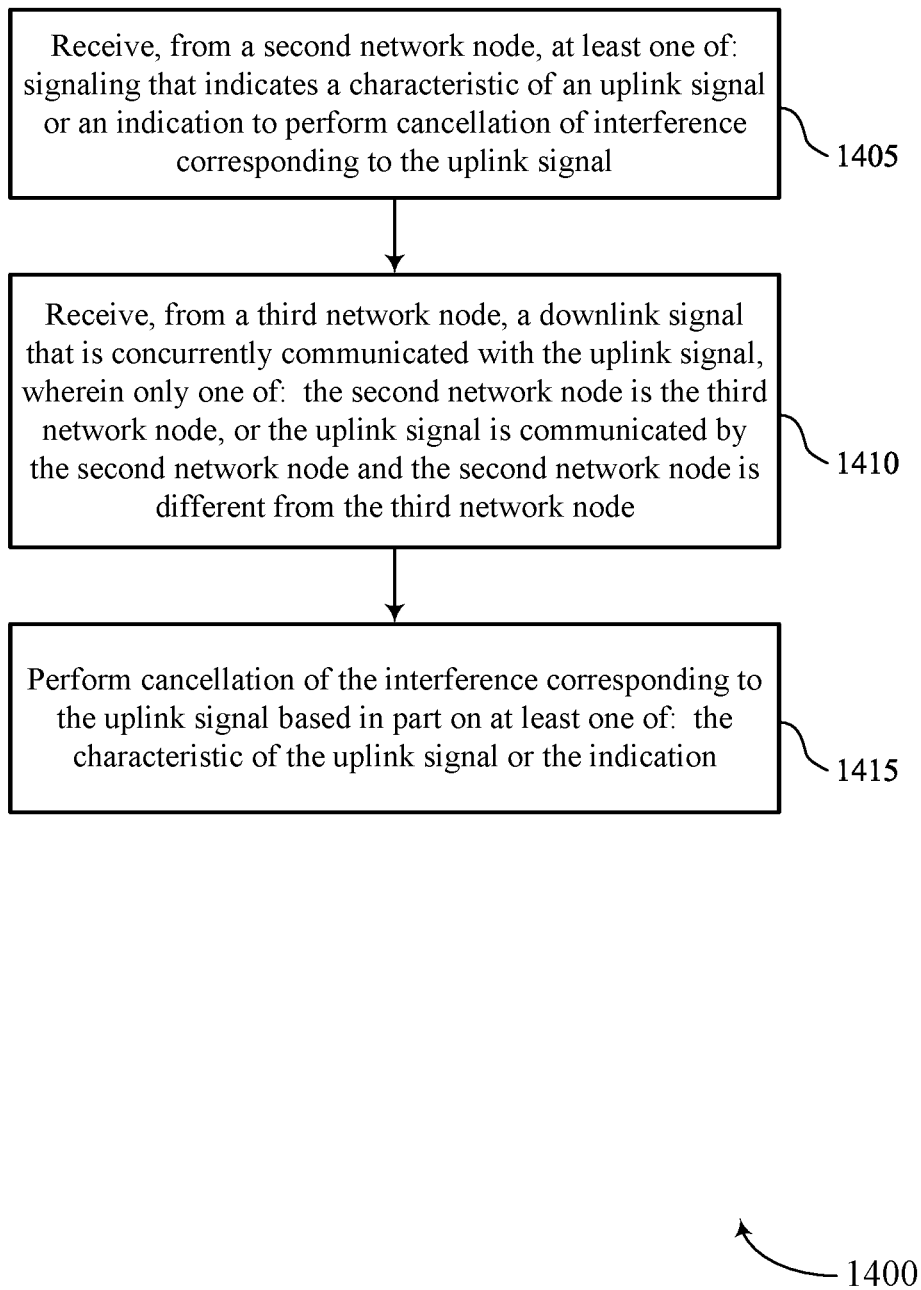
FIGS. 14 and 15 show flowcharts illustrating methods that support signal estimation for interference cancellation in accordance with aspects of the present disclosure.

FIG. 14 shows a flowchart illustrating a method 1400 that supports signal estimation for interference cancellation in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include receiving, from a second network node, at least one of: signaling that indicates a characteristic of an uplink signal or an indication to perform cancellation of interference corresponding to the uplink signal. The operations of 1405 may be performed in accordance with examples as disclosed herein. In some examples, aspects of the operations of 1405 may be performed by an interference indication reception component 825 as described with reference to FIG. 8.

At 1410, the method may include receiving, from a third network node, a downlink signal that is concurrently communicated with the uplink signal, where only one of: the second network node is the third network node, or the uplink signal is communicated by the second network node and the second network node is different from the third network node. The operations of 1410 may be performed in accordance with examples as disclosed herein. In some examples, aspects of the operations of 1410 may be performed by a downlink signal reception component 830 as described with reference to FIG. 8.

At 1415, the method may include performing cancellation of the interference corresponding to the uplink signal based on at least one of: the characteristic of the uplink signal or the indication. The operations of 1415 may be performed in accordance with examples as disclosed herein. In some examples, aspects of the operations of 1415 may be performed by an interference cancellation component 835 as described with reference to FIG. 8.

Figure 15:
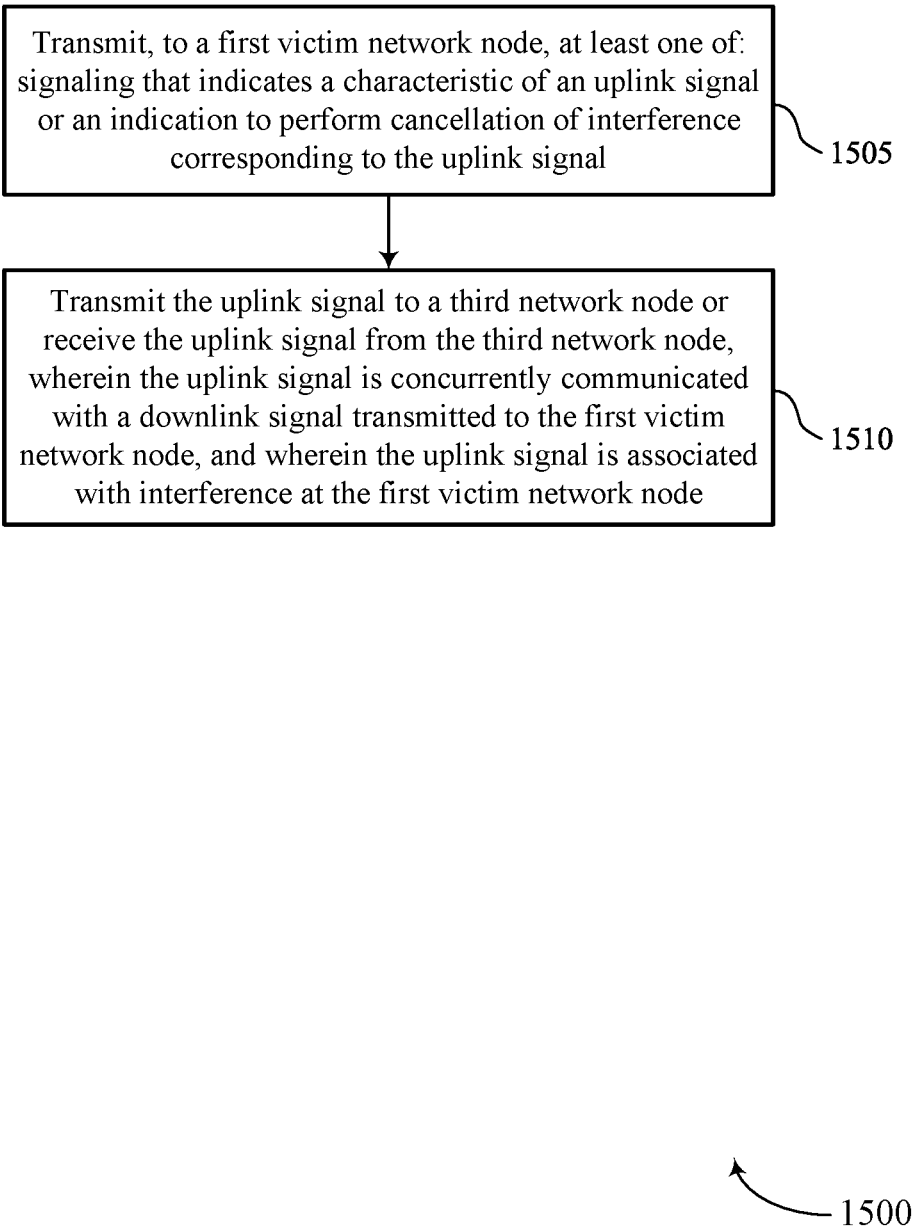

FIG. 15 shows a flowchart illustrating a method 1500 that supports signal estimation for interference cancellation in accordance with aspects of the present disclosure. The operations of the method 1500 may be implemented by a UE or a base station or its components as described herein. For example, the operations of the method 1500 may be performed by a UE 115 as described with reference to FIGS. 1 through 9 or a base station 105 as described with reference to FIGS. 1 through 5 and 10 through 13. In some examples, a UE or a base station may execute a set of instructions to control the functional elements of the UE or the base station to perform the described functions. Additionally or alternatively, the UE or the base station may perform aspects of the described functions using special-purpose hardware.

At 1505, the method may include transmitting, to a first victim network node, at least one of: signaling that indicates a characteristic of an uplink signal or an indication to perform cancellation of interference corresponding to the uplink signal. The operations of 1505 may be performed in accordance with examples as disclosed herein. In some examples, aspects of the operations of 1505 may be performed by an interference indication transmission component 840 or an interference indication transmission component 1225 as described with reference to FIGS. 8 and 12.

At 1510, the method may include transmitting the uplink signal to a third network node or receive the uplink signal from the third network node, where the uplink signal is concurrently communicated with a downlink signal transmitted to the first victim network node, and where the uplink signal is associated with interference at the first victim network node. The operations of 1510 may be performed in accordance with examples as disclosed herein. In some examples, aspects of the operations of 1510 may be performed by an uplink signal communication component 845 or an uplink signal communication component 1230 as described with reference to FIGS. 8 and 12.

The following provides an overview of aspects of the present disclosure:

Aspect 1: A method of wireless communication performed by a first network node, comprising: receiving, from a second network node, at least one of: signaling that indicates a characteristic of an uplink signal or an indication to perform cancellation of interference corresponding to the uplink signal; receiving, from a third network node, a downlink signal that is concurrently communicated with the uplink signal, wherein only one of: the second network node is the third network node, or the uplink signal is communicated by the second network node and the second network node is different from the third network node; and performing cancellation of the interference corresponding to the uplink signal based on at least one of: the characteristic of the uplink signal or the indication.

Aspect 2: The method of aspect 1, wherein the characteristic of the uplink signal comprises a bandwidth for performing the cancellation of the interference corresponding to the uplink signal.

Aspect 3: The method of any of aspects 1 through 2, wherein the uplink signal is transmitted by a fourth network node, and the second network node is the third network node.

Aspect 4: The method of aspect 3, wherein the indication to perform the cancellation of the interference is based on at least one of: a time resource allocation for the uplink signal, a frequency resource allocation for the uplink signal, or an amount of data buffered for the uplink signal.

Aspect 5: The method of any of aspects 1 through 4, wherein performing the cancellation of the interference corresponding to the uplink signal comprises: estimating the interference corresponding to the uplink signal based on the characteristic of the uplink signal; and subtracting the estimated interference from the downlink signal.

Aspect 6: The method of any of aspects 1 through 5, wherein the characteristic of the uplink signal comprises a modulated signal carrying a baseband of the uplink signal.

Aspect 7: The method of any of aspects 1 through 6, wherein the characteristic of the uplink signal comprises a resource allocation for the uplink signal, a transmit beam corresponding to the uplink signal, an MCS corresponding to the uplink signal, a transmit power corresponding to the uplink signal, or any combination thereof.

Aspect 8: A method of wireless communication at a second network node, comprising: transmitting, to a first victim network node, at least one of: signaling that indicates a characteristic of an uplink signal or an indication to perform cancellation of interference corresponding to the uplink signal; and transmitting the uplink signal to a third network node or receive the uplink signal from the third network node, wherein the uplink signal is concurrently communicated with a downlink signal transmitted to the first victim network node, and wherein the uplink signal is associated with interference at the first victim network node.

Aspect 9: The method of aspect 8, further comprising: transmitting, to the first victim network node, the downlink signal, wherein the downlink signal is associated with full-duplex communications between the second network node and the first victim network node and between the second network node and the third network node.

Aspect 10: The method of any of aspects 8 through 9, wherein the characteristic of the uplink signal comprises a bandwidth for performing cancellation of the interference corresponding to the uplink signal.

Aspect 11: The method of any of aspects 8 through 10, wherein the uplink signal is transmitted from the third network node to the second network node or from the second network node to the third network node.

Aspect 12: The method of aspect 11, wherein the indication to perform the cancellation of the interference is based on a time resource allocation for the uplink signal at least partially overlapping with a time resource allocation for the downlink signal.

Aspect 13: The method of any of aspects 11 through 12, wherein the indication to perform the cancellation of the interference is based on a frequency resource allocation for the uplink signal at least partially overlapping with a frequency resource allocation for the downlink signal.

Aspect 14: The method of any of aspects 11 through 13, wherein the indication to perform the cancellation of the interference is based on an amount of data buffered for the uplink signal satisfying a threshold.

Aspect 15: The method of any of aspects 8 through 14, wherein the characteristic of the uplink signal comprises a modulated signal carrying a baseband of the uplink signal.

Aspect 16: The method of any of aspects 8 through 15, wherein the characteristic of the uplink signal comprises a resource allocation for the uplink signal, a transmit beam corresponding to the uplink signal, an MCS corresponding to the uplink signal, a transmit power corresponding to the uplink signal, or any combination thereof.

Aspect 17: An apparatus comprising at least one processor; and memory communicatively coupled to the at least one processor, wherein the at least one processor is configured to perform a method of any of aspects 1 through 7.

Aspect 18: An apparatus comprising at least one means for performing a method of any of aspects 1 through 7.

Aspect 19: A non-transitory computer-readable medium storing code the code comprising instructions executable by a processor to perform a method of any of aspects 1 through 7.

Aspect 20: An apparatus comprising at least one processor; and memory communicatively coupled to the at least one processor, wherein the at least one processor is configured to perform a method of any of aspects 8 through 16.

Aspect 21: An apparatus comprising at least one means for performing a method of any of aspects 8 through 16.

Aspect 22: A non-transitory computer-readable medium storing code the code comprising instructions executable by a processor to perform a method of any of aspects 8 through 16.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). As used herein, the phrase "based on" is inclusive of all interpretations and shall not be limited to any single interpretation unless specifically recited or indicated as such. For example, the phrase "based on A" (where "A" may be information, a condition, a factor, or the like) may be interpreted as: "based at least on A," "based in part on A," "based at least in part on A," "based only on A," or "based solely on A." Accordingly, as disclosed herein, "based on A" may, in one aspect, refer to "based at least on A." In another aspect, "based on A" may refer to "based in part on A." In another aspect, "based on A" may refer to "based at least in part on A." In another aspect, "based on A" may refer to "based only on A." In another aspect, "based on A" may refer to "based solely on A." In another aspect, "based on A" may refer to any combination of interpretations in the alternative.

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first network node for wireless communication, comprising:
    at least one processor; and
    memory communicatively coupled to the at least one processor, wherein the at least one processor is configured to:
        receive, from a second network node via a sidelink channel, signaling that indicates a baseband of an uplink signal that is communicated by the second network node, wherein the uplink signal is a source of interference to the first network node;
        receive, from a third network node, a downlink signal that is concurrently communicated with the uplink signal, wherein the second network node is different from the third network node; and
        perform cancellation of the interference corresponding to the uplink signal based on the baseband of the uplink signal.

2. The first network node of claim 1, wherein the signaling further comprises a characteristic of the uplink signal, wherein the characteristic comprises a bandwidth for performing the cancellation of the interference corresponding to the uplink signal.

3. The first network node of claim 1, wherein the signaling that indicates the baseband of the uplink signal is triggered based on satisfaction of a threshold by an amount of data buffered for the uplink signal.

4. The first network node of claim 1, wherein the at least one processor is configured to:
    estimate the interference corresponding to the baseband of the uplink signal; and
    subtract the estimated interference from the downlink signal.

5. The first network node of claim 1, wherein the signaling comprises a modulated signal carrying the baseband of the uplink signal.

6. The first network node of claim 1, wherein the signaling further comprises a characteristic of the uplink signal, wherein the characteristic comprises a resource allocation for the uplink signal, a transmit beam corresponding to the uplink signal, a modulation coding scheme corresponding to the uplink signal, a transmit power corresponding to the uplink signal, or any combination thereof.

7. A method of wireless communication performed by a first network node, comprising:
    receiving, from a second network node via a sidelink channel, signaling that indicates a baseband of an uplink signal that is communicated by the second network node, wherein the uplink signal is a source of interference to the first network node;
    receiving, from a third network node, a downlink signal that is concurrently communicated with the uplink signal, wherein the second network node is different from the third network node; and performing cancellation of the interference corresponding to the uplink signal based on the baseband of the uplink signal.

8. The method of claim 7, wherein the signaling further comprises a characteristic of the uplink signal, wherein the characteristic comprises a bandwidth for performing the cancellation of the interference corresponding to the uplink signal.

9. The method of claim 7, wherein the signaling that indicates the baseband of the uplink signal is triggered based on satisfaction of a threshold by an amount of data buffered for the uplink signal.

10. The method of claim 7, wherein performing the cancellation of the interference corresponding to the uplink signal comprises:
estimating the interference corresponding to the baseband of the uplink signal; and
subtracting the estimated interference from the downlink signal.

11. The method of claim 7, wherein the signaling further comprises a characteristic of the uplink signal, wherein the characteristic comprises a modulated signal carrying the baseband of the uplink signal, a resource allocation for the uplink signal, a transmit beam corresponding to the uplink signal, a modulation coding scheme corresponding to the uplink signal, a transmit power corresponding to the uplink signal, or any combination thereof.

12. The method of claim 7, wherein the signaling comprises a modulated signal carrying the baseband of the uplink signal.

13. A non-transitory computer-readable medium having code for wireless communication stored thereon that, when executed by a first network node, causes the first network node to:
receive, from a second network node via a sidelink channel, signaling that indicates a baseband of an uplink signal that is communicated by the second network node, wherein the uplink signal is a source of interference to the first network node;
receive, from a third network node, a downlink signal that is concurrently communicated with the uplink signal, wherein the second network node is different from the third network node; and
perform cancelation of the interference corresponding to the uplink signal based on the baseband of the uplink signal.

14. The non-transitory computer-readable medium of claim 13, wherein the signaling further comprises a characteristic of the uplink signal, wherein the characteristic comprises a bandwidth for performing the cancellation of the interference corresponding to the uplink signal.

15. The non-transitory computer-readable medium of claim 13, wherein the signaling that indicates the baseband of the uplink signal is triggered based on satisfaction of a threshold by an amount of data buffered for the uplink signal.

16. The non-transitory computer-readable medium of claim 13, wherein the code, when executed by the first network node, causes the first network node to:
estimate the interference corresponding to the baseband of the uplink signal; and
subtract the estimated interference from the downlink signal.

17. The non-transitory computer-readable medium of claim 13, wherein the signaling comprises a modulated signal carrying the baseband of the uplink signal.

18. The non-transitory computer-readable medium of claim 13, wherein the signaling further comprises a characteristic of the uplink signal, wherein the characteristic comprises a resource allocation for the uplink signal, a transmit beam corresponding to the uplink signal, a modulation coding scheme corresponding to the uplink signal, a transmit power corresponding to the uplink signal, or any combination thereof.

19. A first network node for wireless communication comprising:
means for receiving, from a second network node via a sidelink channel, signaling that indicates a baseband of an uplink signal that is communicated by the second network node, wherein the uplink signal is a source of interference to the first network node;
means for receiving, from a third network node, a downlink signal that is concurrently communicated with the uplink signal, wherein the second network node is different from the third network node; and
means for performing cancellation of the interference corresponding to the uplink signal based on the baseband of the uplink signal.

20. The first network node of claim 19, wherein the signaling further comprises a characteristic of the uplink signal, wherein the characteristic comprises a bandwidth for performing the cancellation of the interference corresponding to the uplink signal.

21. The first network node of claim 19, wherein the signaling that indicates the baseband of the uplink signal is triggered based on satisfaction of a threshold by an amount of data buffered for the uplink signal.

22. The first network node of claim 19, further comprising:
means for estimating the interference corresponding to the baseband of the uplink signal; and
means for subtracting the estimated interference from the downlink signal.

23. The first network node of claim 19, wherein the signaling comprises a modulated signal carrying the baseband of the uplink signal.

24. The first network node of claim 19, wherein the signaling further comprises a characteristic of the uplink signal, wherein the characteristic comprises a resource allocation for the uplink signal, a transmit beam corresponding to the uplink signal, a modulation coding scheme corresponding to the uplink signal, a transmit power corresponding to the uplink signal, or any combination thereof.

\* \* \* \* \*